(12) United States Patent

Bradley

(10) Patent No.: US 12,576,924 B2

(45) Date of Patent: ***Mar. 17, 2026

(54) METHOD FOR APPLYING TENSION TO AERODYNAMIC TRAILER SKIRT

(71) Applicant: Trailer Aerodynamics LLC, Chicago, IL (US)

(72) Inventor: Calvin Rhett Bradley, Blountville, TN (US)

(73) Assignee: Trailer Aerodynamics LLC, Chicago, IL (US)

(*) Notice: Subject to any disclaimer, the term of this patent is extended or adjusted under 35 U.S.C. 154(b) by 421 days.

This patent is subject to a terminal disclaimer.

(21) Appl. No.: 18/029,984

(22) PCT Filed: Oct. 30, 2020

(86) PCT No.: PCT/US2020/058233

§ 371 (c)(1),
(2) Date: Apr. 3, 2023

(87) PCT Pub. No.: WO2022/093266

PCT Pub. Date: May 5, 2022

(65) Prior Publication Data

US 2024/0002000 A1 Jan. 4, 2024

(51) Int. Cl.
*B62D 35/00* (2006.01)

(52) U.S. Cl.
CPC .................................. *B62D 35/001* (2013.01)

(58) Field of Classification Search
CPC ...................................................... B62D 35/001
See application file for complete search history.

(56) References Cited

U.S. PATENT DOCUMENTS 8,727,425 B1 5/2014 Senatro
2023/0356789 A1* 11/2023 Bradley .............. B62D 35/001

FOREIGN PATENT DOCUMENTS

WO 2017059327 A1 4/2017
WO WO-2021064586 A1 * 4/2021 ........... B62D 35/001

OTHER PUBLICATIONS

European Patent Office, International Search Report dated Sep. 1, 2021 and Written Opinion of the International Searching Authority, pp. 1-14 (included), European Patent Office, Rijswijk, The Netherlands.

* cited by examiner

*Primary Examiner* — Faye M Fleming

(74) *Attorney, Agent, or Firm* — Hansen Reynolds LLC

(57) ABSTRACT

An apparatus for supporting a trailer skirt is provided that has a trailer mounting bracket that carries a bending member. A skirt attachment is present and is configured for engaging a skirt of a trailer. The bending member is received by the skirt attachment such that the bending member is configured to slide relative to the skirt. A stop member is included that limits sliding of the bending member relative to the skirt.

18 Claims, 24 Drawing Sheets

METHOD FOR APPLYING TENSION TO AERODYNAMIC TRAILER SKIRT

CROSS-REFERENCE TO RELATED APPLICATIONS

The present application is a 35 U.S.C. § 371 application of PCT/US2020/058233 filed on Jan. 7, 2021 and entitled "Stop Member for a Trailer Skirt Support" and claims benefit thereto. The entire contents of PCT/US2020/058233 are incorporated by reference herein in their entirety for all purposes.

FIELD OF THE INVENTION

The subject matter of the present invention relates to a stop member for a trailer skirt support that supports a skirt of a trailer. More particularly, the present application involves a stop member that limits movement of a bending member of the trailer skirt support relative to the skirt when the skirt is deflected.

BACKGROUND OF THE INVENTION

Trailers towed by trucks and similar vehicles for transporting cargo can be large, unwieldy, and include geometries which invite inefficiencies during travel. One aspect of these inefficiencies concerns the aerodynamics of the trailer. In an effort to improve trailer aerodynamics, trailers have been built, supplemented, or retro-fitted with trailer skirts (or side skirts), devices affixed to the underside which limit air circulating in the empty space between the trailer's axles. By reducing the amount of airflow in this space, drag caused by turbulence is reduced. The reduction in drag permits the trailer to be towed more efficiently, increasing the gas mileage and performance of the vehicle and its cargo. Trailer skirts should be rigid enough to not deform in their normal operating condition to appropriately deflect air and prevent drag on the moving trailer, however the skirt needs to exhibit some degree of flexibility because it is close to the ground and can hit curbs, snow, road debris, or other objects thus necessitating movement of the skirt to prevent the skirt from being detached or damaged.

It is known to provide support members attached to the trailer that engage and support the skirt. These support members themselves can flex to accommodate flexing of the skirt when the skirt strikes an object. The support member includes a skirt attachment connected to the skirt and a bending member that is flexible that slides against the skirt attachment when the skirt is hit and deflects laterally. The edges of the bending member are received within slots of the skirt attachment and slide up or down relative to the skirt attachment depending upon whether the skirt is being deflected outboard or inboard by the particular striking object. If the bending member slides downward relative to the skirt attachment the skirt attachment would eventually hit the bracket that attaches the bending member to the trailer and sliding movement at this point would cease. Once the force of deflection is removed, the bending member and skirt can be made flexible enough to spring back into their normal, at-rest positions so that this deflection does not cause any damage and so that they do not have to be adjusted by the operator for continued use.

If the bending member slides upwards relative to the skirt attachment, it may be the case that the bending member moves to such a degree that the edges of the bending member move out of the slots of the skirt attachment. Once the force of deflection is removed, the skirt and bending member may spring back to their normal, at-rest positions. However, due to the flexibility of these components it may be the case that upon deflecting back the end of the bending member does not move right into the skirt attachment such that the edges of the bending member are not repositioned back into the slots of the skirt attachment to achieve their before deflection arrangement. Instead, the bending member may lay over the skirt attachment and touch the outside of the skirt attachment and be deflected a bit due to this engagement. In such situations, to return the skirt support to its designed orientation, the operator must go under the trailer and manually deflect the skirt and reposition the bending member so that it is once again inserted into the skirt attachment. Aside from the inconvenience and labor involved in such a practice, this repair may not be accomplished right away which would lead the skirt and skirt support to function in less than ideal conditions for some time. A problem thus exists in the provision of skirt supports in having bending members disengaged from the skirt attachments when certain degrees and directions of deflection occur, and the present application provides a solution to this problem by preventing the disengagement of the skirt attachment and bending member when this deflection occurs.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

The use of identical or similar reference numerals in different figures denotes identical or similar features.

DETAILED DESCRIPTION OF THE INVENTION

Figure 1:
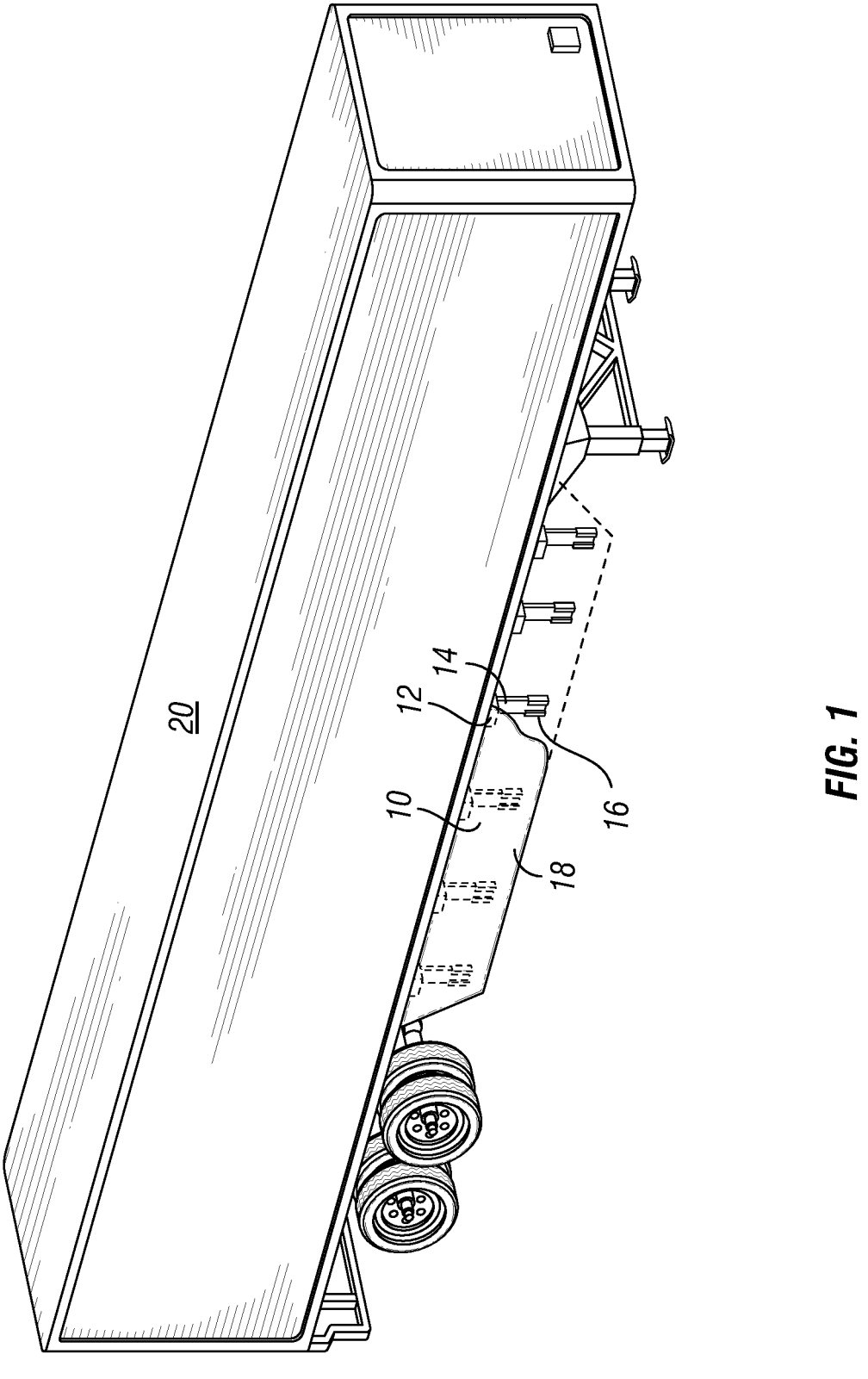
FIG. 1 is a perspective view of an aerodynamic trailer system attached to a trailer with a portion of the skirt shown in hidden line for clarity.

Reference will now be made in detail to embodiments of the invention, one or more examples of which are illustrated in the drawings. Each example is provided by way of explanation of the invention and is not meant as a limitation of the invention. For example, features illustrated or described as part of one embodiment can be used with another embodiment to yield still a third embodiment. It is intended that the present invention include these and other modifications and variations.

The present invention provides for an apparatus 10 that has a bending member 14 and a skirt attachment 16 that support a skirt 18 of a trailer 20 when the skirt 18 bends through engagement with an object 88 such as a barrier or curb. The apparatus 10 has a stop member 22 with a first element 24 on the skirt attachment 16 and a second element 26 located on the bending member 14. When the skirt 18 hits the object 88 and is deflected, the bending member 14 slides relative to the skirt 18 and the skirt attachment 16 until the two elements 24, 26 come into contact with one another. At such time, the two elements 24, 26 are engaged and relative movement between the bending member 14 and the skirt attachment 16, and thus the skirt 18 as well, is prevented. The skirt 18 can continue to bend, but the skirt attachment 16 and bending member 14 are locked and bend with the skirt 18 and do not slide relative to the skirt 18. Once the force of the object 88 is removed, the elements return to their normal, at-rest positions. Since the bending member 14 was not removed from the skirt attachment 16 during the bending, the bending member 14 is properly located within the skirt attachment 16 in the at-rest position and does not need to be readjusted by the operator and will immediately be able to function as designed again should the skirt 18 engage another object 88.

An apparatus 10 fitted onto a trailer 20 is illustrated with reference to FIG. 1 in which the skirt 18 is located under the trailer 20 and prevents air from hitting the rear wheels of the trailer 20 during travel of the trailer 20. The skirt 18 extends in a longitudinal direction of the trailer 20 and may be oriented at an angle to the trailer 20 or in some instances may extend in the same direction as the length of trailer 20. The skirt 18 can have any length in the longitudinal direction but generally extends from the rear wheels to the vertical support of the trailer 20. A second skirt (not shown) can be located on the opposite side of the trailer 20 to prevent or direct air flow related to the opposite side. Any number of bending members 14 may be used to support the skirt 18. Brackets can be attached to the top of the skirt 18 and the bottom surface or I-beams of the trailer 20 to in turn attach the skirt 18 to the trailer 20. The opposite skirt (not shown) may likewise have any number of support members integrated therewith for its support.

The height of the skirt 18 may be selected so that it is large enough to cover the necessary area of air deflection that is desired, yet small enough so that it is not scraping the ground or otherwise easily hitting the road surface or objects 88 resting on the road surface. It is presumed, however, that in the normal course of driving the skirt 18 will strike objects 88 when the trailer 20 navigates curves, goes over objects, reaches a crown in the road, hits a snowbank, or otherwise engages anything found on roads or in distribution centers.

Figure 2:
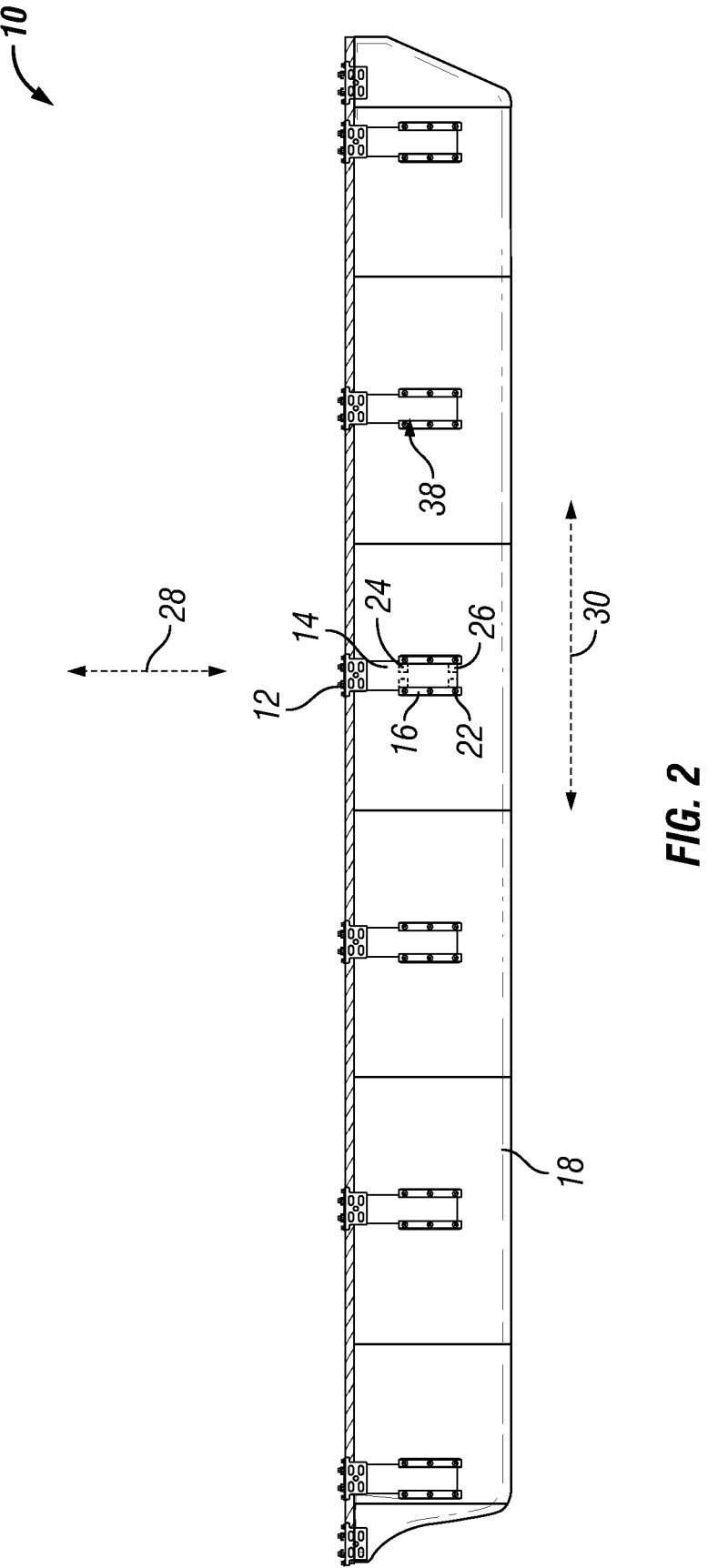
FIG. 2 is a back elevation view of the apparatus including the skirt, trailer mounting bracket, bending member, and skirt attachment.

A back view of the skirt 18 with the attached bending members 14 of the apparatus 10 is illustrated with reference to FIG. 2. A trailer mounting bracket 12 is attached to the trailer 20, for example through bolting, and the bending member 14 is attached to the trailer mounting bracket 12 and extends in the vertical direction. The bending members 14 and trailer mounting brackets 12 are located at the top of the skirt 18 in the vertical direction and are generally spaced evenly from one another in the longitudinal direction. The bending members 14 extend from the top of the skirt 18 downward in the vertical direction but do not extend the entire length of the height of the skirt 18. Instead, the bending members 14 stop short of the bottom of the skirt 18. The skirt 18 may be a single piece member made up of one component or can be multiple components that are attached to one another. In the embodiment in FIG. 2, the skirt 18 is made from a plurality of central panels that are attached to one another to form almost the entire length. A rear trailer skirt panel forms the back end of the skirt 18 and is attached to the tailing central panel. The rear trailer skirt panel has a shape and size different than the central panel to which it is attached. A front trailer skirt panel is located at the front of the skirt 18 and is attached to and shaped and sized differently than the leading central panel.

The bending members 14 may be configured in a variety of manners in accordance with different exemplary embodiments so that they perform the functions of supporting the skirt 18 and allow for bending of the skirt 18 to take place when the skirt 18 engages an object 88. The bending member 14 may comprise a rigid or flexible member, may be elongate, and can be attached to the skirt 18 using any desired mechanism, such as by use of one or more fasteners, weldments, adhesives, clamps, and/or mounting brackets as previously stated.

Figure 3:
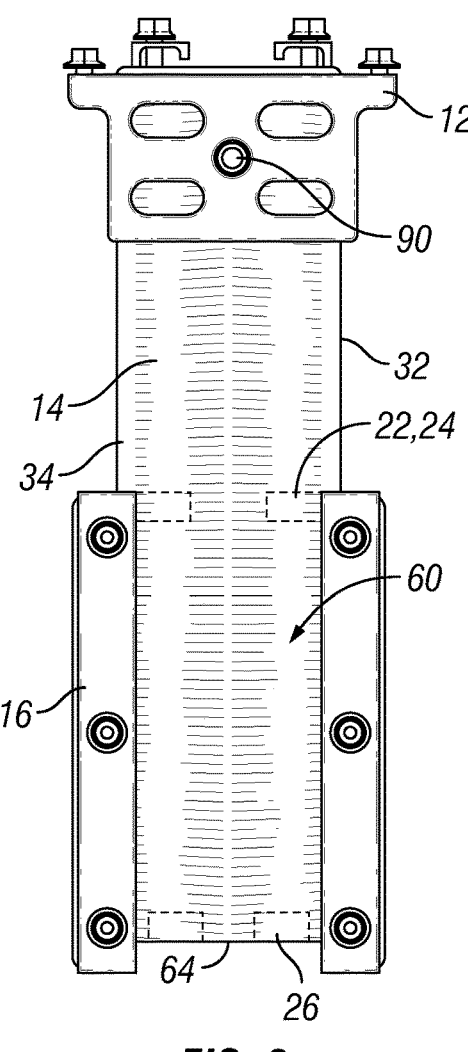
FIG. 3 is a back elevation view of the trailer mounting bracket, bending member, and skirt attachment.
Figure 4:
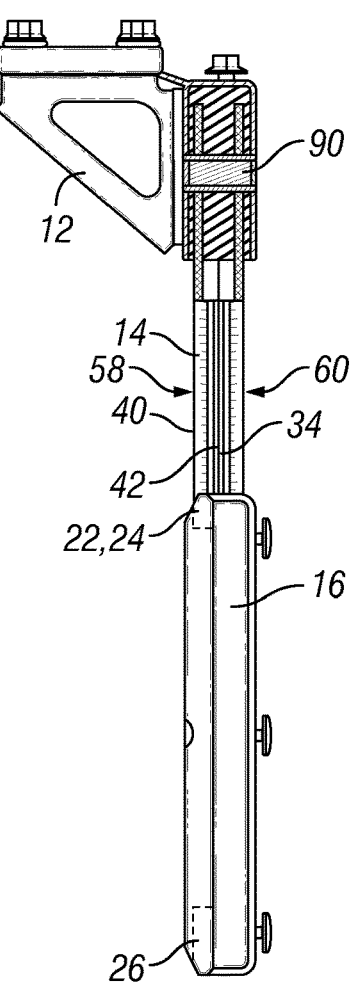
FIG. 4 is a side elevation view of FIG. 3.
Figure 5:
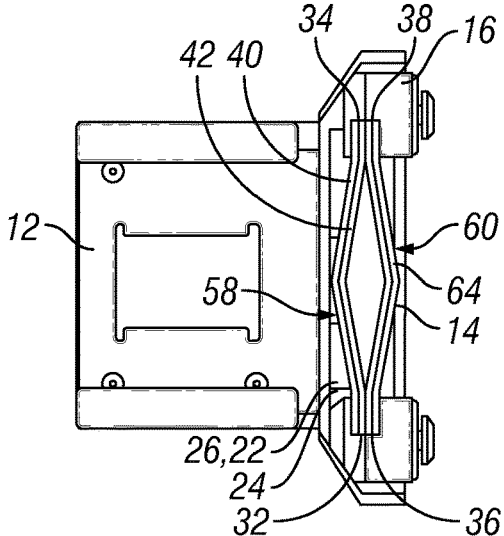
FIG. 5 is a bottom view of FIG. 3.

In certain embodiments, as discussed further below, the bending member 14 is a bi-modulus bending member, and the step of assembly comprises attaching a skirt attachment 16 to the skirt 18, and the bending member 14 to the trailer 20 in a cantilevered position. One such design is illustrated with reference to FIGS. 3-5. It is appreciated that in any cantilevered configuration, the bi-modulus bending member 14 may be fixedly attached at any point along its length, including at a terminal end thereof. It is also appreciated that the bending member 14 may be attached in any desired manner, such as by use of one or more fasteners, weldments, adhesives, clamps, and/or mounting brackets, for example. The bending member 14 is mounted to the trailer mounting bracket 12 with a connection that does not pivot but is generally static. In some arrangements, and as shown in FIGS. 3-5, the bending member 14 is retained within a pin 90 and resilient member attachment, which is made of an elastomeric material, that permits the bending member 14 to twist while remaining fixed in certain directions within the apparatus 10 by the pin 90 extending through the bending member 14 and into the trailer mounting bracket 12. The skirt attachment 16 is connected to the skirt 18 with a connection that does not pivot. As shown, six bolts are used to attach the skirt attachment 16 to the skirt 18. The bending member 14 engages the skirt attachment 16 and is held therein. In some embodiments, the bending member 14 is non-pivotally attached to the trailer mounting bracket 12 and does not move therewith. For example, the bending member 14 may be bolted to the trailer mounting bracket 12. In other arrangements, the bending member 14 may slide relative to the trailer mounting bracket 12. The bending member 14 may have any cross-sectional shape, and as illustrated is made of a plurality of bending elements 40, 42 that are V-shaped that nest within one another and that face corresponding bending elements. As shown, especially with reference to FIG. 5, there are four bending elements shown, two of them 40, 42 being nested with one another, and the other two being nested with one another. Any number of bending elements 40, 42 can be used and they may or may not be nested with one another in accordance with various exemplary embodiments.

The bending member 14 is designed to resist an applied force without noticeably bending or deforming, but when the applied force exceeds a designed threshold force, the bi-modulus elongate bending member 14 elastically bends into a bent arrangement, which may bifurcate the bi-modulus elongate bending member 14, and elastically returns to its original or unbent arrangement. When bending, the bi-modulus bending member 14 buckles (that is, the cross-section buckles), whereby the cross-section shape (profile) changes from a first cross-section shape to a second cross-section shape. The first cross-sectional shape is shown with reference to FIGS. 3-5, and the second cross-sectional shape is shown with reference to FIG. 6. By doing so, the bi-modulus elongate bending member 14 and each of the one or more bending elements 40, 42 forming the bending member 14 elastically buckle and bend to a buckled configuration when an applied force (such as its lateral force component) exceeds a threshold force and elastically return to an unbuckled or unbent configuration when the applied force is reduced below the threshold force or removed. Stated differently, the bi-modulus elongate bending member 14 can be characterized as being a bi-modulus (or bi-stable) member, where each member or element resists bending with a first bending modulus until it buckles or collapses and thereafter bending ensues without any notable plastic deformation or resistance, where the buckled cross-section has a second bending modulus.

In particular embodiments, the bi-modulus characteristic is accomplished by the bending member 14 being a thin-walled member, having a sufficiently thin thickness, such as a thickness of 1.0 millimeters (mm) or less, or 0.5 mm or less, for example. In certain embodiments, the bending member 14 is made of a plurality of bending elements 40, 42 each made of a sheet of spring steel that is 0.5 mm or less thick, and in other variations, made from any other similarly thin product made of a material other than steel, whether inelastic or elastic, such as any metal, polymer, or other material. Additionally, or in the alternative, in certain embodiments, the bi-modulus characteristic for a bending member 14 is accomplished by the height of the cross-section being less than the width. By increasing the height, the bending stiffness increases, while decreasing the height, the bending stiffness decreases. It is also noted that when employing a plurality of stacked bending elements 40, 42, the stacked bending elements 40, 42 are able to slide relative to each other, which also facilitates the bi-modulus behavior. Moreover, the bi-modulus characteristic may be further accomplished by the unbent or unbuckled cross-section being asymmetrical, the cross-section being asymmetric relative to a centerline extending in a direction of the bending member's 14 width. The centerline forms a neutral bending axis or a line that divides the cross-sectional area into equal halves. It is appreciated that any cross-section of the bending member 14 may be constant or variable in size and/or shape along the length of the bending member 14. Although shown as V-shaped, the bending member 14 can be variously shaped in other embodiments and may be selected of material that is of a desired thickness. In some embodiments, the bending member 14 is a single flat, thin bar capable of bending when sufficient force is applied and springing back into its initial shape when the force is removed.

The orientation of the bending member 14 and the skirt attachment 16 is in its first cross-sectional shape in FIGS. 3-5 in which they can support the skirt 18. When an object 88 strikes the skirt 18 and supplies a sufficient amount of force thereto, it may deflect and the bending member 14 can likewise deflect so that it assumes a second cross-sectional shape as shown with reference to FIG. 6. Here, the skirt 18 is connected to the skirt attachment 16 via six bolts, although any number may be used in other embodiments. As the bending member 14 is bent from the first cross-sectional shape, a portion of it compresses at the turn radius and the rest above and below this turn radius may change shape. The bending member 14 is in the second cross-sectional shape in FIG. 6 and maintains this shape while holding the skirt 18 and can spring back into the first cross-sectional shape when the force from the object 88 is removed, such as once the skirt 18 moves over the curb 88 and out of engagement therewith so that the buckling force is removed. During this deformation, the skirt attachment 16, and the skirt 18, slide relative to the bending member 14 in the sliding direction 28 because the skirt attachment 16 and the bending member 14 are in sliding engagement. The bending member 14 will spring back to the first cross-sectional shape and configuration as shown in FIGS. 3-5, and there will be no damage or permanent deformation to the bending member 14 as it is designed to make this type of return. The bending member 14 thus has a first bending modulus in the FIGS. 3-5 configuration that resists bending to a certain degree and has a second bending modulus in the FIG. 6 configuration different than the first bending modulus in which bending in this configuration is resisted to a different degree.

The bending member 14 is in sliding connection with the skirt attachment 16 so that when the bending member 14 bends from the first cross-sectional shape to the second cross-sectional shape it shortens in the vertical direction. The height of the apparatus 10 shortens when the bending member 14 changes from the first cross-sectional shape to the second cross-sectional shape. As this happens, the bending member 14 slides relative to the skirt attachment 16 and slides out of the bottom of the skirt attachment 16 as the length of the bending member 14 shortens in the vertical direction. It is therefore the case that the bending member 14 may extend below the skirt attachment 16 in the vertical direction during normal use and functioning of the apparatus 10. The trailer mounting bracket 12 is thus rigidly attached to the trailer 20 and the bending member 14 is coupled to the skirt 18 in a sliding engagement. It can be seen that the bending member 14 slides in the sliding direction 28 through the skirt attachment 16 so that some of it is below the skirt attachment 16 when looking at FIG. 6 as compared to their relative position in FIGS. 3-5 in which none of the bending member 14 is below the skirt attachment 16.

Figure 6:
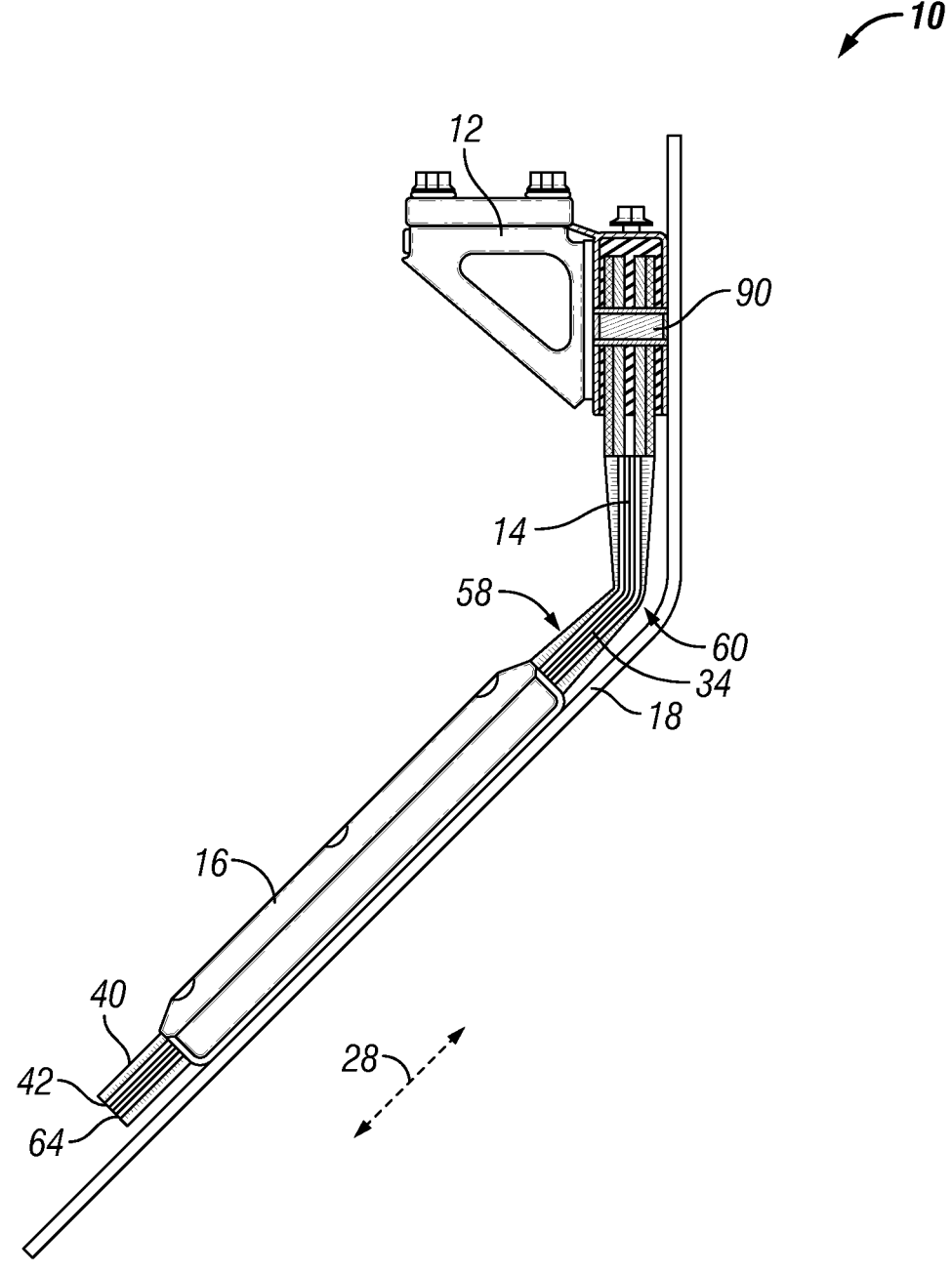
FIG. 6 is a side elevation view with the apparatus receiving a force that causes bending of the skirt and bending member and sliding of the skirt relative to the bending member.
Figure 7:
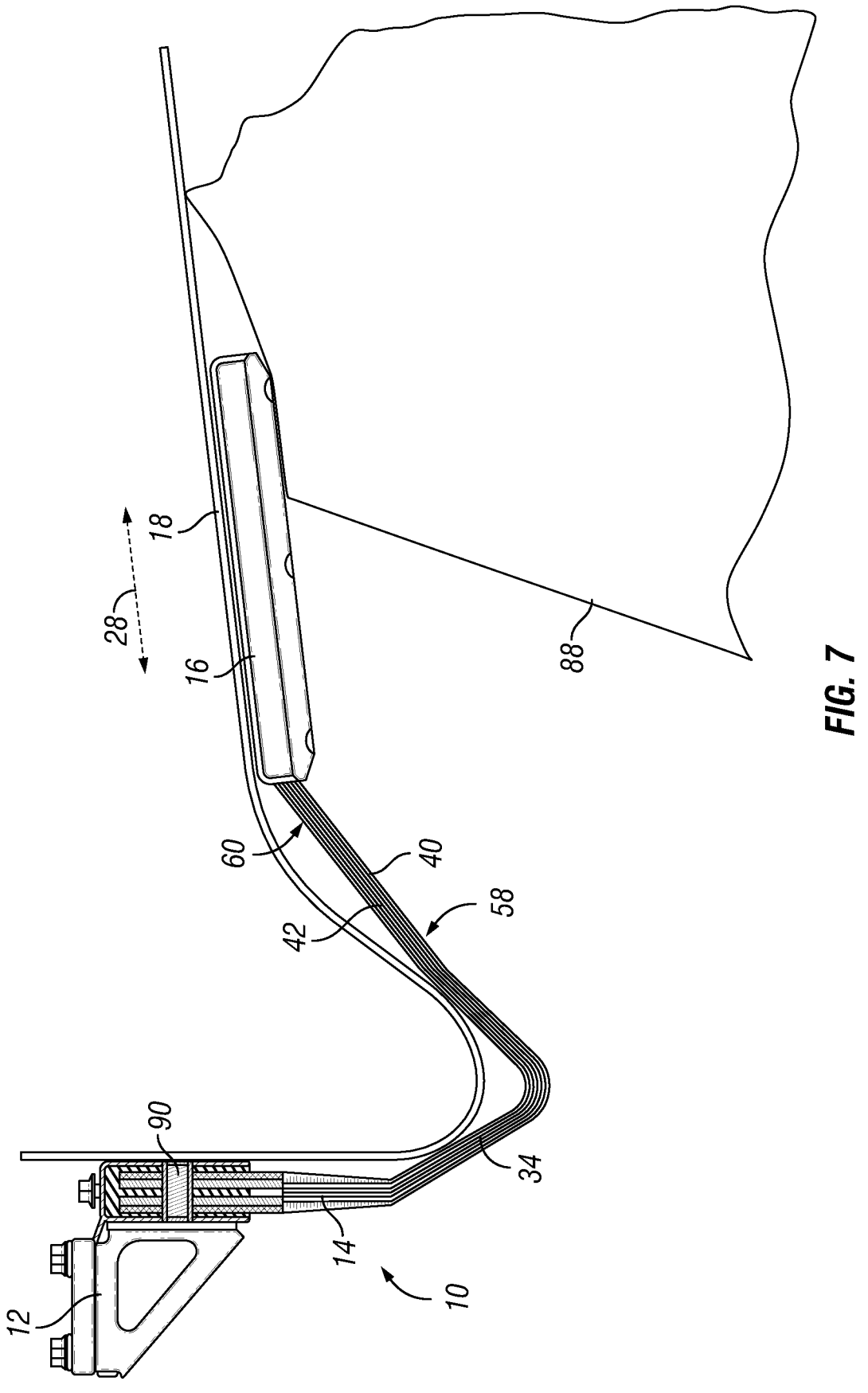
FIG. 7 is a side elevation view with the apparatus receiving a force in an opposite direction from that in FIG. 6.

In FIG. 7, the object 88 causes a force to be imparted onto the bending member 14 in a direction opposite to that of the force illustrated in FIG. 6. In this regard, the bending member 14 bends in the opposite direction from that of FIG. 6. The bending member 14 assumes a different orientation than that in FIG. 6 and can bend so as to have various bending radii along the length of the bending member 14. The skirt attachment 16 again slides relative to the bending member 14, and the bending member 14 also slides relative to the skirt 18 in the sliding direction 28. If the sliding is to a great extent, the bending member 14 may be moved relative to the skirt attachment 16 to such an extent it falls out of the skirt attachment 16. The orientation of the apparatus 10 shown in FIG. 7 is moving outboard in the lateral direction so that it moves outward from under the trailer 20. The bending member 14 is shown in a position that it just exits the skirt attachment 16, and once disengaged from the skirt attachment 16 it may not reinsert back into the skirt attachment 16 when the force from the object 88 is removed and the components all spring back into their at-rest positions. Instead, the bending member 14 may lay on the front of the skirt attachment 16 so as to be angled slightly relative to the skirt 18 and not oriented completely in the vertical direction.

Figure 8:
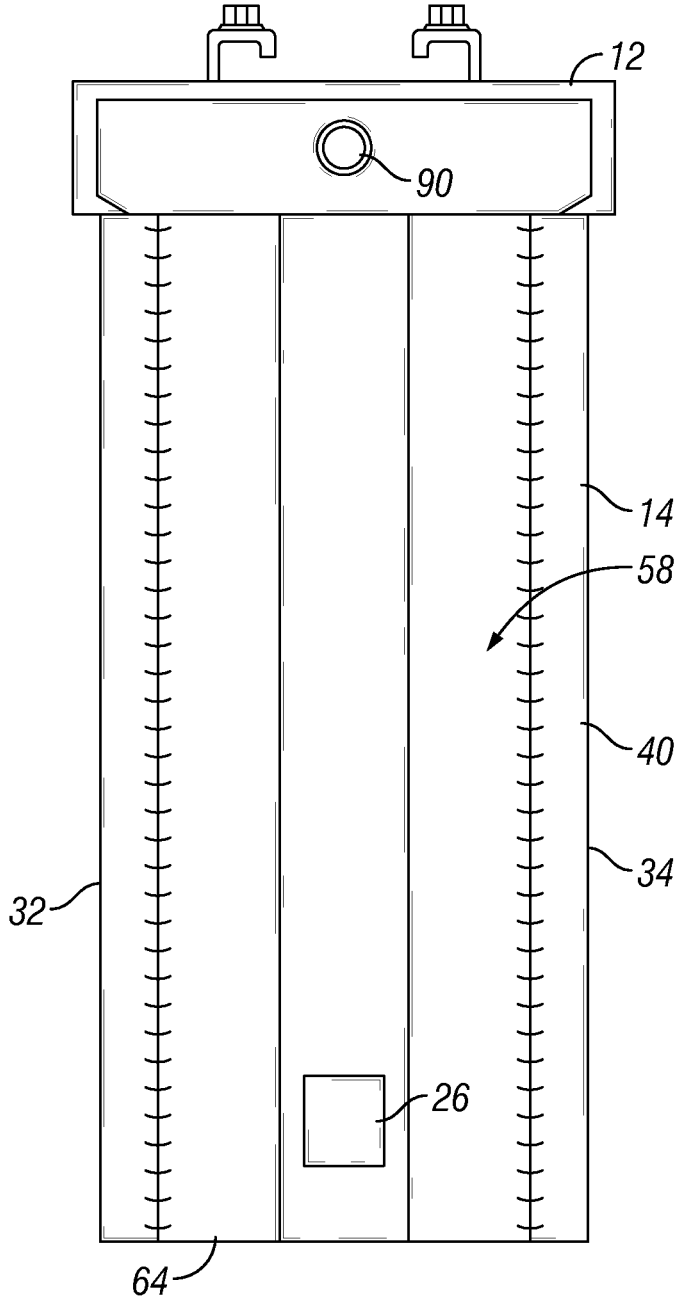
FIG. 8 is a front elevation view of the trailer mounting bracket and bending member showing a second element of the stop member on the bending member.

FIG. 8 shows a trailer mounting bracket 12 that has V-shaped bending member 14. The bending member 14 has a left edge 32 and a right edge 34, and a top face 58 that extends from the left edge 32 to the right edge 34. The top face 58 has five different planer surfaces. The second element 26 of the stop member 22 is carried on the top face 44 of the bending member 14. The second element 26 in this embodiment is a projection that extends out of the top face 58. The second element 26 can be variously shaped and may be integrally formed with the bending member 14 or can be a separate component that is attached to the bending member 14 and does not move relative to the bending member. The second element 26 is located on the flat panel of the first bending element 40 that is in the center in the width direction. The second element 26 is spaced from the terminal end 64 of the bending member 14 but is located proximate to the terminal end 64.

Figure 9:
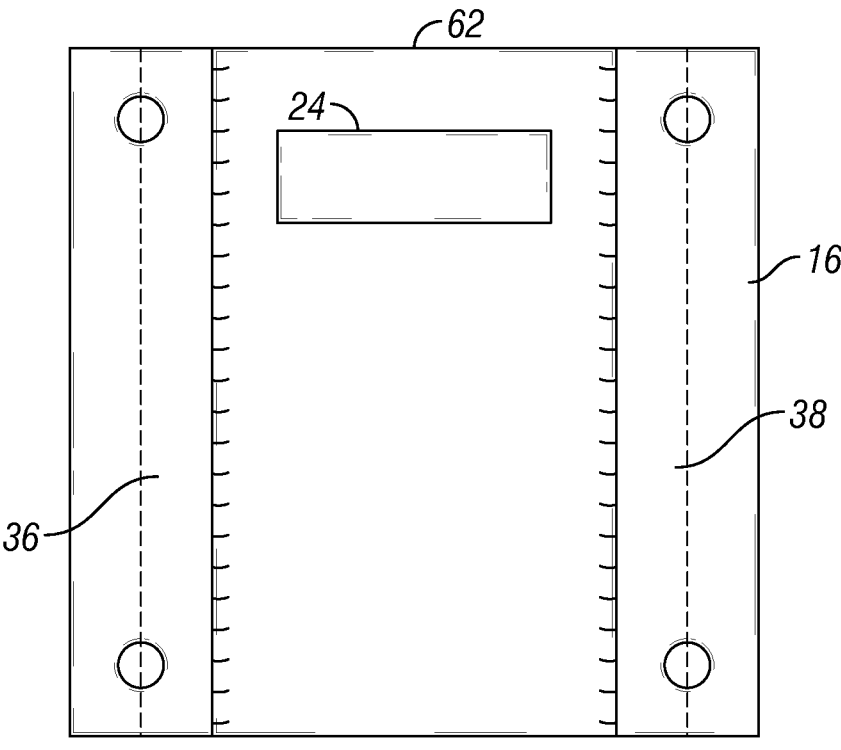
FIG. 9 is a back elevation view of a skirt attachment showing a first element of the stop member.

FIG. 9 shows the complimentary skirt attachment 16 to the bending member 14 of FIG. 8, in which the first element 24 of the stop member 22 is shown. The first element 24 is spaced from the terminal end 62 of the skirt attachment 16 but is proximate to the terminal end 62. The first element 24 is centered in the width direction of the skirt attachment 16 and is a projection that extends outward from the illustrated surface of the skirt attachment 16. The first element 24 can be integrally formed with the skirt attachment 16 or may be a separate piece that is rigidly attached to the skirt attachment 16 so that it does not move relative to the skirt attachment 16.

Figure 10:
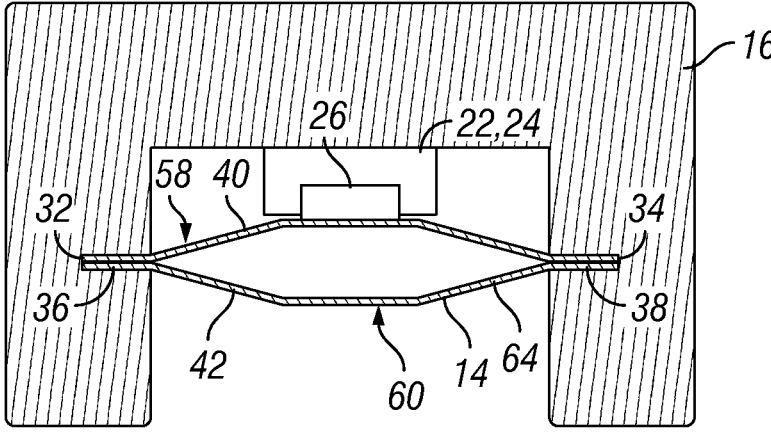
FIG. 10 is a cross-sectional view of the bending member and skirt attachment of FIGS. 8 and 9 with the first and second element of the stop member.

FIG. 10 shows the interaction of the bending member 14 and the skirt attachment 16 during the normal configuration of the skirt 18 when it is not bent or otherwise deformed via excessive force applied thereto. The bending member 14 and skirt attachment 16 from FIGS. 8 and 9 are the ones shown in FIG. 10. The bending member 14 has a pair of bending elements 40, 42 that are disposed in a V-shaped arrangement relative to one another. The top face 58 of the bending member 14 is found on the first bending element 40 and faces away from the skirt 18. The bottom face 60 of the bending member 14 is found on the second bending element 42 and faces towards the skirt 18. The two bending elements 40, 42 engage one another at the left and right edges 32, 34 of the bending member 14. The skirt attachment 16 is U-shaped and has a left slot 36 into which the left edge 32 of the bending member 14 is disposed, and a right slot 38 into which the right edge 34 of the bending member 14 is disposed. The edges 32, 34 slide along the slots 36, 38 to allow the bending member 14 and the skirt attachment 16 to move relative to one another.

The stop member 22 is made up of two elements, a first element 24 on the skirt attachment 16, and a second element 26 on the top face 58 of the bending member 14. The first element 24 is wider than the second element 26 and extends for a farther distance in the vertical direction. However, the two elements 24, 26 may be similarly sized and shaped in other embodiments or can be variously shaped from the ones shown. In use, when the bending member 14 and skirt attachment 16 slide relative to one another, they will at some point move into engagement with one another. When this happens, relative movement of the bending member 14 to the skirt attachment 16 in this direction will be prevented because of the engagement of the elements 24, 26. However, the engagement will not prevent relative movement in the opposite direction. When the force is released and the objects move in the opposite direction, the bending member 14 will move so that the elements 24, 26 move out of engagement with one another and the bending member 14 slides relative to the skirt attachment 16 back into the at-rest position in which the elements 24 and 26 are not in engagement.

Figure 11:
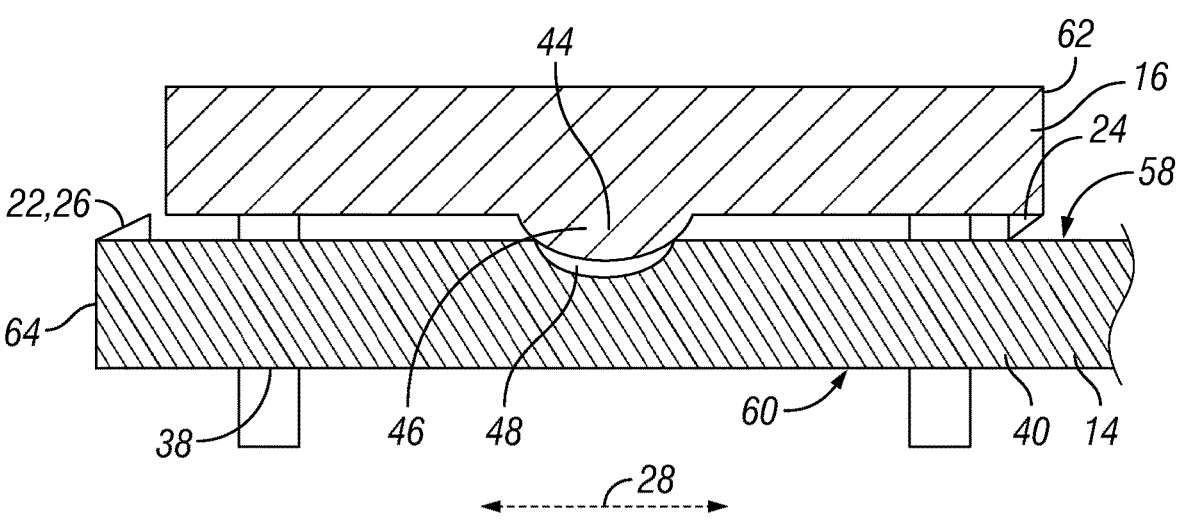
FIG. 11 is a cross-sectional view of portions of a skirt attachment and bending member with a locating feature and a stop member.
Figure 12:
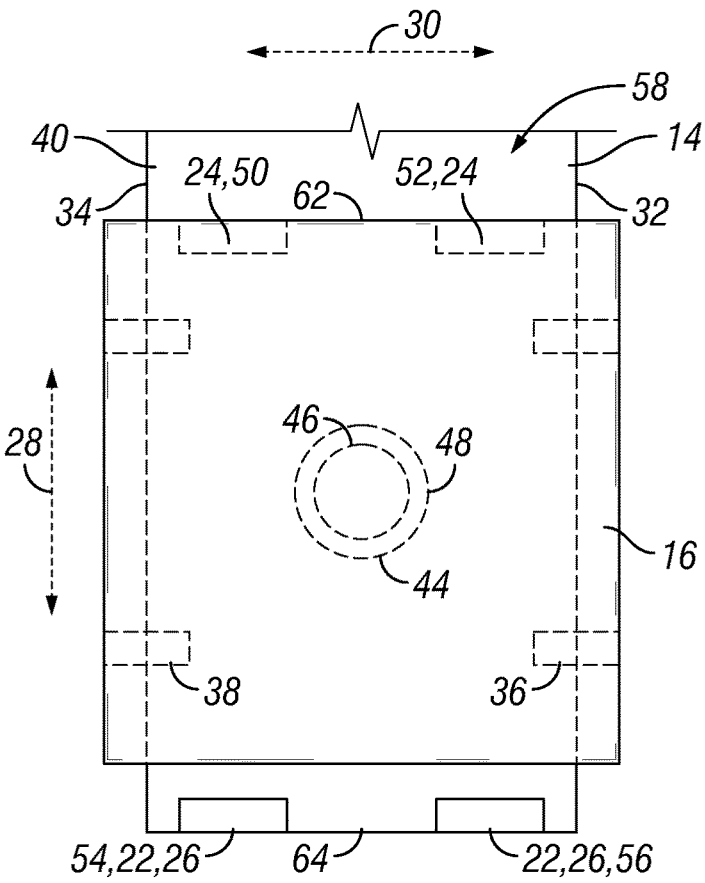
FIG. 12 is a top plan view of the skirt attachment and bending member of FIG. 11.

FIGS. 11 and 12 show an alternative exemplary embodiment in which the apparatus 10 has a locating feature 44. The locating feature 44 has a second member 48, that in this case is a recess 48 in the top surface 58 of the bending member 14, that receives a first member 46 that in this embodiment is a projection 46 so that a portion of the projection 46 is received within the recess 48. The first member 46 is on the same surface of the skirt attachment 16 as is the first element 24. The projection 46 engages the first bending element 40 and can completely fill the recess 48, but in the embodiment shown does not completely fill the recess 48 so that a space still exists in the recess 48 even with the projection 46 inserted. The locating feature 44 is not present on the second bending element 42. With the projection 46 inserted into the recess 48 and engaging portions of the first bending member 40, it can be realized that movement between these two members 46, 48 will be limited. Although the second bending member 42 does not engage the projection 46, its movement will likewise be limited because the second bending member 42 is pinned to the first bending member 40 via the pin 90. The limitation of movement imparted by the locating feature 22 is in the sliding direction 28 of the bending member 14, and is not in a direction perpendicular to this sliding direction 28 which would be up and down in FIG. 11 and thus in the direction from the first bending element 40 to the second bending element 42. The projection 46 can have a convex surface that has a radius larger than the radius of the concave receptacle 48. This arrangement creates engagement of the projection 46 against the bending member 14 at its leading and trailing locations in the sliding direction 28 which prevents movement of the bending member 14 relative to the skirt attachment 16 in the sliding direction 28.

With the projection 46 within the recess 48 the interaction prevents small movements between the bending member 14 and the skirt attachment 16 when small forces are imparted to these members so that vibration is minimized and/or eliminated, and so that wear between these parts 14, 16 by way of these constant movements is likewise minimized and/or eliminated. Further, since the recess 48 and the projection 46 are noticeable on the bending member 14 and skirt attachment 16, they can be used to properly position these two components when the apparatus 10 is assembled so that the skirt attachment 16 is properly located relative to the bending member 14, trailer mounting bracket 12, and skirt 18. The locating feature 44 prevents small relative movements between the bending member 14 and skirt attachment 16 when small forces are applied to one or both of these members, but do not interact to such an extent that it prevents all movement. In this regard, if a sufficient amount of force is applied then the projection 46 and recess 48 will be disengaged from one another allowing movement between the bending member 14 and skirt attachment 16. The disengagement will be affected by flexing of the first bending element 40 to allow the projection 46 to slide out of the recess 48. Likewise, the projection 46 could be flexible as well in other embodiments so that it can flex to allow the interaction of the projection 46 and the recess 48 to cease, to allow movement of the bending member 14 and the skirt attachment 16. The configuration of the locating feature 44 can be varied in accordance with various embodiments, and it is to be understood that the illustrated design is only exemplary and that others are possible.

The embodiment in FIGS. 11 and 12 includes a stop member 22 with a first element 24 that extends from a terminal end 62 of the skirt attachment 16, and a second element 26 that extends from a terminal end 64 of the bending member 14. The first and second elements 24, 26 are provided to prevent the bending member 14 from becoming removed from the skirt attachment 16 upon experiencing too much movement in one direction in the sliding direction 28. The stop member 22 is shown disengaged, and as the bending member 14 moves in the sliding direction 28 relative to the skirt attachment 16, the two elements 24, 26 will approach one another until the bending member 14 is almost removed from the skirt attachment 16. At this point, the two elements 24, 26 will engage one another and relative movement in the sliding direction 28 will be prevented so that the bending member 14 will not be disengaged from the skirt attachment 16. The bending member 14 will be rigidly attached to the skirt attachment 16 such that both of these components lock together during the excessive deflection of the skirt 18. Once the force is removed from the skirt 18, the bending member 14 is allowed to move in the opposite direction in the sliding direction 28 relative to the skirt attachment 16 because the elements 24, 26 do not impede motion in this direction. The first and second elements 24, 26 will become disengaged and the bending member 14 can move back into the position illustrated in FIG. 12 relative to the skirt attachment 16. The first and second elements 24, 26 do not prevent or impede relative motion in the opposite direction such that if the skirt attachment 16 slides toward the trailer mounting bracket 12 in the sliding direction 28 the first and second elements 24, 26 will not function to lock or stop relative motion in this direction.

The first and second elements 24, 26 are not a single element but are separate elements spaced from one another in the width direction 30. The first element 24 is made up of a first component 50 and a second component 52 that are spaced from one another in the width direction 30, and both of the components 50, 52 extend from the terminal end 62 and are located on the same surface of the skirt attachment 16 and extend from this surface. The first and second components 50, 52 are identical to one another in size and shape in this embodiment. The second element 26 is also made of two components, one being the first part 54 and the other piece being the second part 56, that are separated from one another in the width direction 30. The parts 54, 56 extend inward from the terminal end 64 and are on the top face 58 of the bending member 14. The parts 54, 56 are sized and shaped identically to one another. In order to provide clearance regarding the projection 46, the first and second parts 54, 56 are spaced a sufficient amount from one another in the width direction 30 on either side of the projection 46 in the width direction 30 so that when the bending member 14 slides through the skirt attachment 16 the first and second parts 54, 56 do not engage the projection 46 and are spaced far enough from it to allow unimpeded sliding. In other embodiments, the second element 26 could be set up to engage the projection 46 to lock the bending member 14 onto the skirt attachment 16. In yet other arrangements, the first and second elements 24, 26 are a single element instead of being separated as illustrated.

Figure 13:
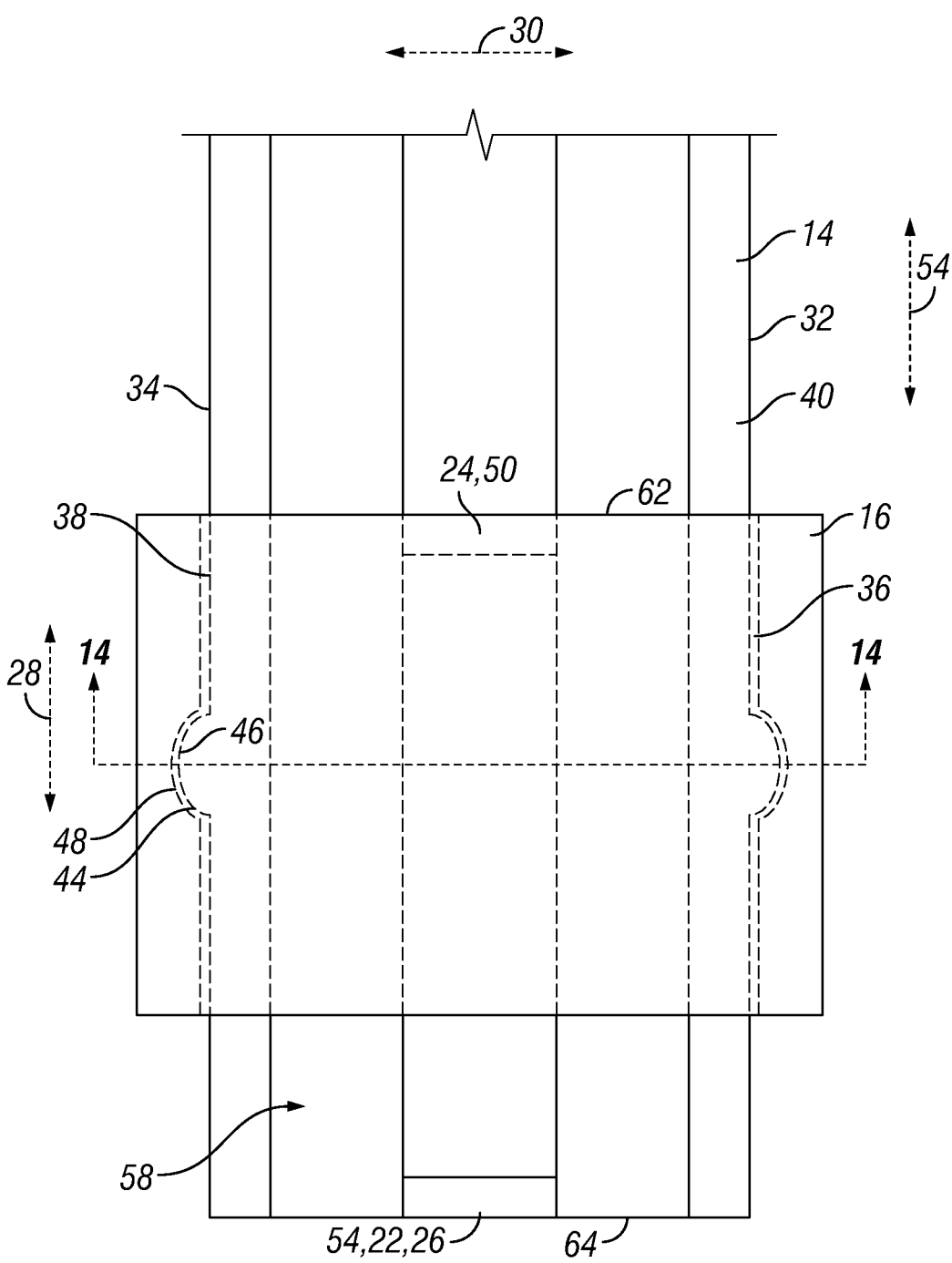
FIG. 13 is a top plan view of a skirt attachment and bending member in which the locating feature is at the edges and slots of the bending member and skirt attachment.
Figure 14:
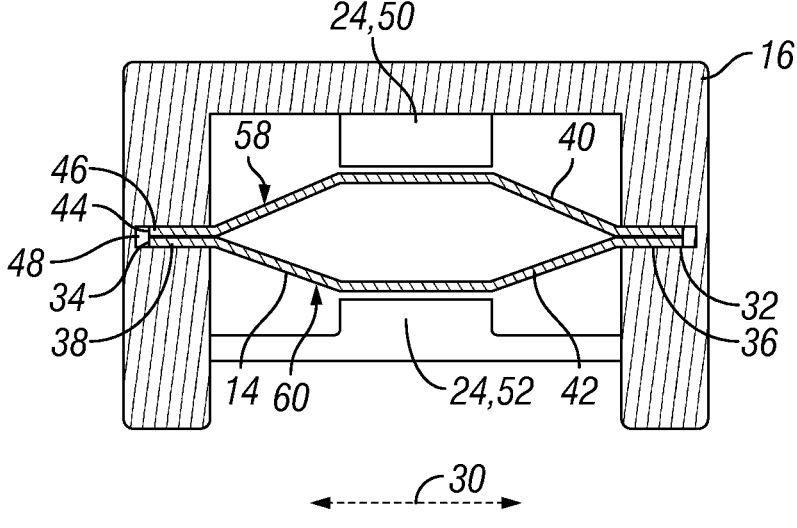
FIG. 14 is a cross-sectional view taken along line 14-14 of FIG. 13.

Another embodiment of the apparatus 10 is shown in FIGS. 13 and 14 in which the locating feature 44 is located on the edges of the bending member 14 and slots of the skirt attachment 16, instead of on the face 58 and inside portion of the skirt attachment 16. The locating feature 44 includes a first member 46 that is a projection 46 that is located on a right edge 34 of the bending member 14. There are two bending elements 40, 42 that make up the bending member 14, and the projection 46 is located on both of the bending elements 40, 42. The edge 34 of the bending member 14 is located within a right slot 38 of the skirt attachment 16 such that both bending elements 40, 42 are also within the right slot 38. The right edge 34 can slide within the right slot 38 which may be aligned in the sliding direction 28. The projection 46 extends laterally outward from the linear portion of the right edge 34. The skirt attachment 16 includes the second member 48 that is a receptacle 48 that has a concave surface. The projection 46 has a convex surface that is disposed within some, but not all of, the receptacle 48. The projection 46 engages the skirt attachment 16 at the leading end and the trailing end and retains the position of the skirt attachment 16 and bending member 14 until the application of a sufficient amount of force to prevent movement in the sliding direction 28.

The left edge 32 and left slot 36 include a second locating feature with a second projection on the left edge 32, and a second receptacle of the left slot 36 that receives the second projection. The second locating feature and its elements can be arranged in the same manners as the locating feature 44 on the right edge 34 and right slot 38, and a repeat of this information is not necessary. Although shown as having two locating features 44, it is to be understood that in other embodiments only a single locating feature 44 may be present. The embodiment shown in FIGS. 13 and 14 also includes a stop member 22 that has a first element 24 with a first component 50 and a second component 52 on opposite sides of the bending member 14 in the thickness direction. The components 50, 52 directly face the top face 58 and the bottom face 60. The second element 26 has a first part 54 at the terminal end 64 on the top face 58, and a second part 56 that extends from the terminal end 64 on the bottom face 60. The first part 54 engages the first component 50, and at the same time the second part 56 engages the second component 52 when the stop member 22 is engaged to prevent further movement of the sliding member 14 in the sliding direction 28 relative to the skirt attachment 16. The stop member 22 prevents movement of the bending member 14 towards the trailer 20/trailer mounting bracket 12 in the sliding direction 28, but does not prevent the opposite movement of the bending member 14 in the sliding direction 28 which would be away from the trailer 20/trailer mounting bracket 12.

Figure 15:
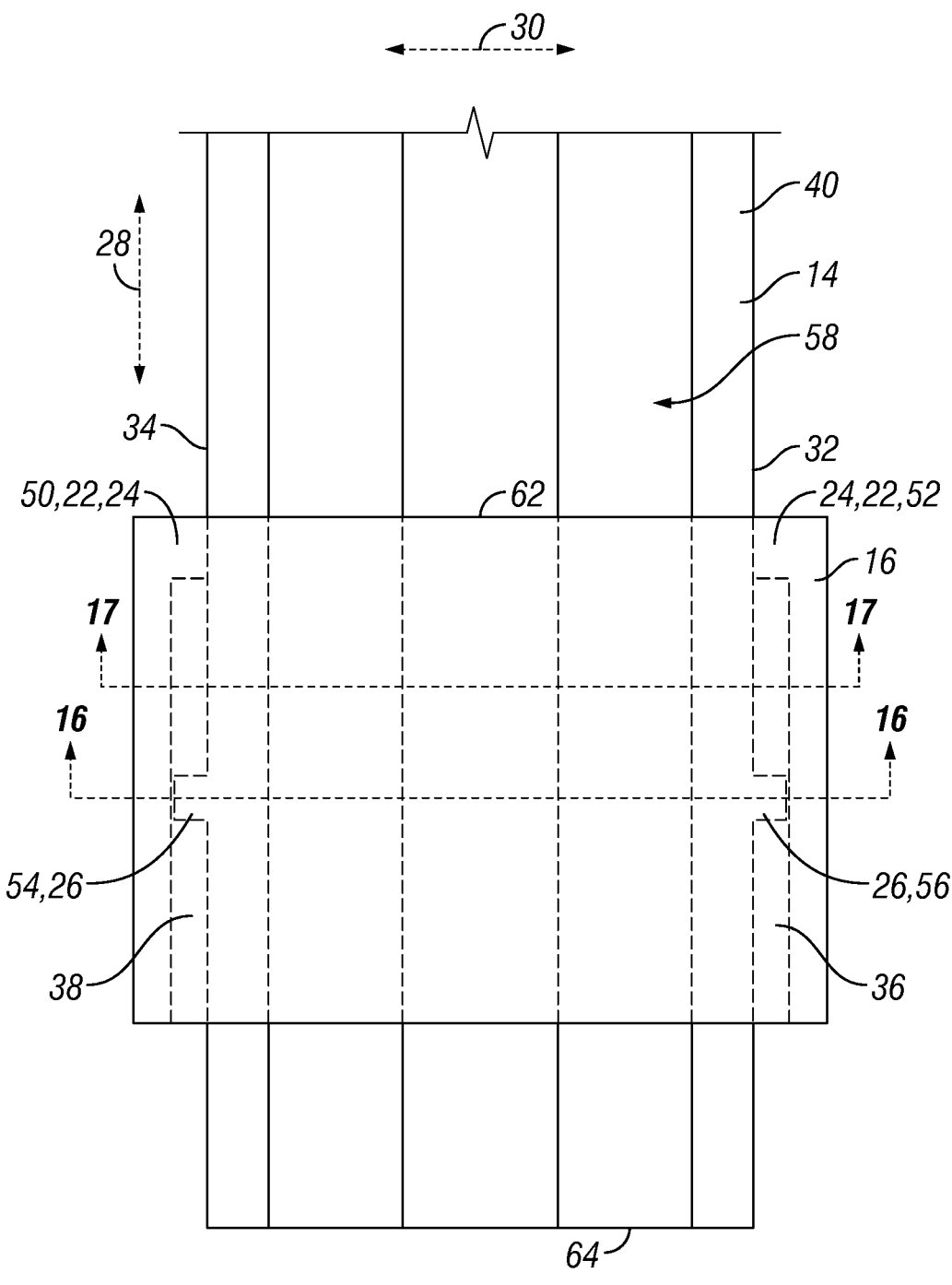
FIG. 15 is a top view of a skirt attachment and bending member with the stop member located at the edges of the bending member and at ends of the slots of the skirt member.
Figure 16:
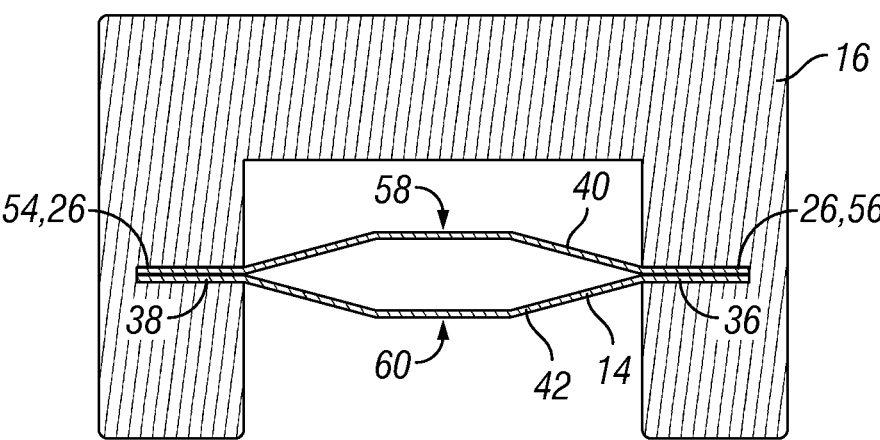
FIG. 16 is a cross-sectional view taken along line 16-16 of FIG. 15.
Figure 17:
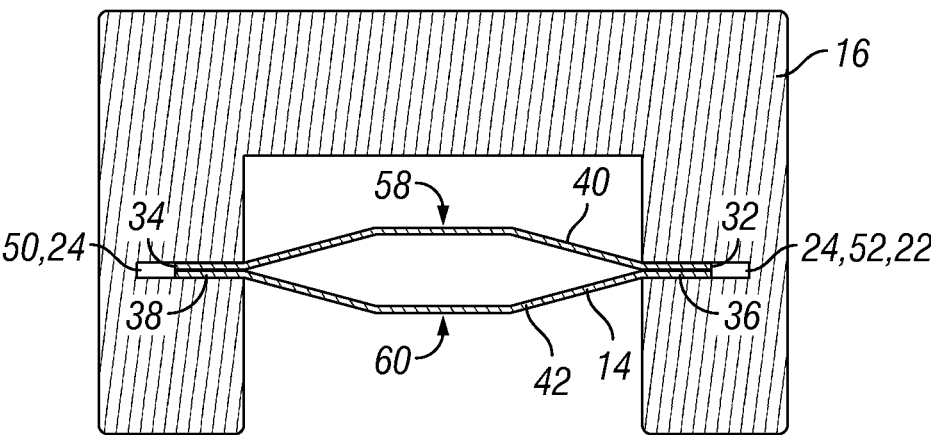
FIG. 17 is a cross-sectional view taken along line 17-17 of FIG. 15.

FIGS. 15-17 illustrate another embodiment of the apparatus 10 configured in a different manner from those previously described. The bending member 14 again moves relative to the skirt attachment 16 in the sliding direction 28. The previously described locating feature 44 is not present but could be in other embodiments. The bending member 14 includes edges 32, 34 that are located within and slide along slots 36, 38. The stop member 22 has a second element 26 broken up into a first part 54 that is on the right edge 34 and slides as well in the right slot 38, and a second part 56 that is on the left edge 32 and slides in the left slot 36. The stop member 22 also has a first element 24 on the skirt attachment 16 that is made up of a first component 50 and a second component 52. The first component 50 closes off the portion of the right slot 38, and the second component 52 closes off a portion of the left slot 36. When the bending member 14 moves relative to the skirt attachment 16 the first part 54 engages the first component 50, and the second part 56 engages the second component 52 and these engagements prevent the bending member 14 from moving any further through the skirt attachment 16. The edges 32, 34 can still move through the slots 36, 38 and past the components 50, 52, but engagement with the first and second parts 54, 56 prevents further movement in this direction in the sliding direction 28.

Figure 18:
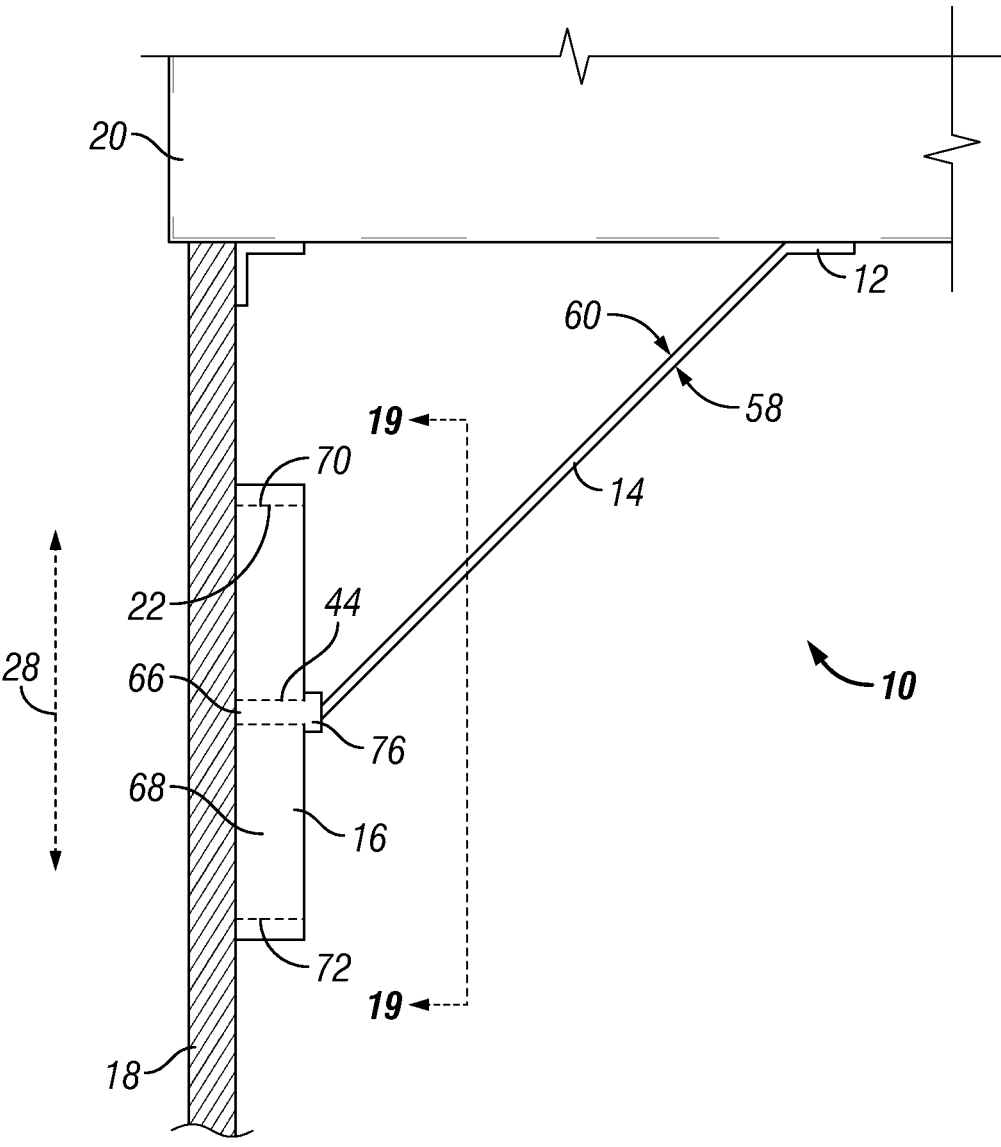
FIG. 18 is a side elevation view of the apparatus with the skirt attachment in sliding engagement with the skirt.
Figure 19:
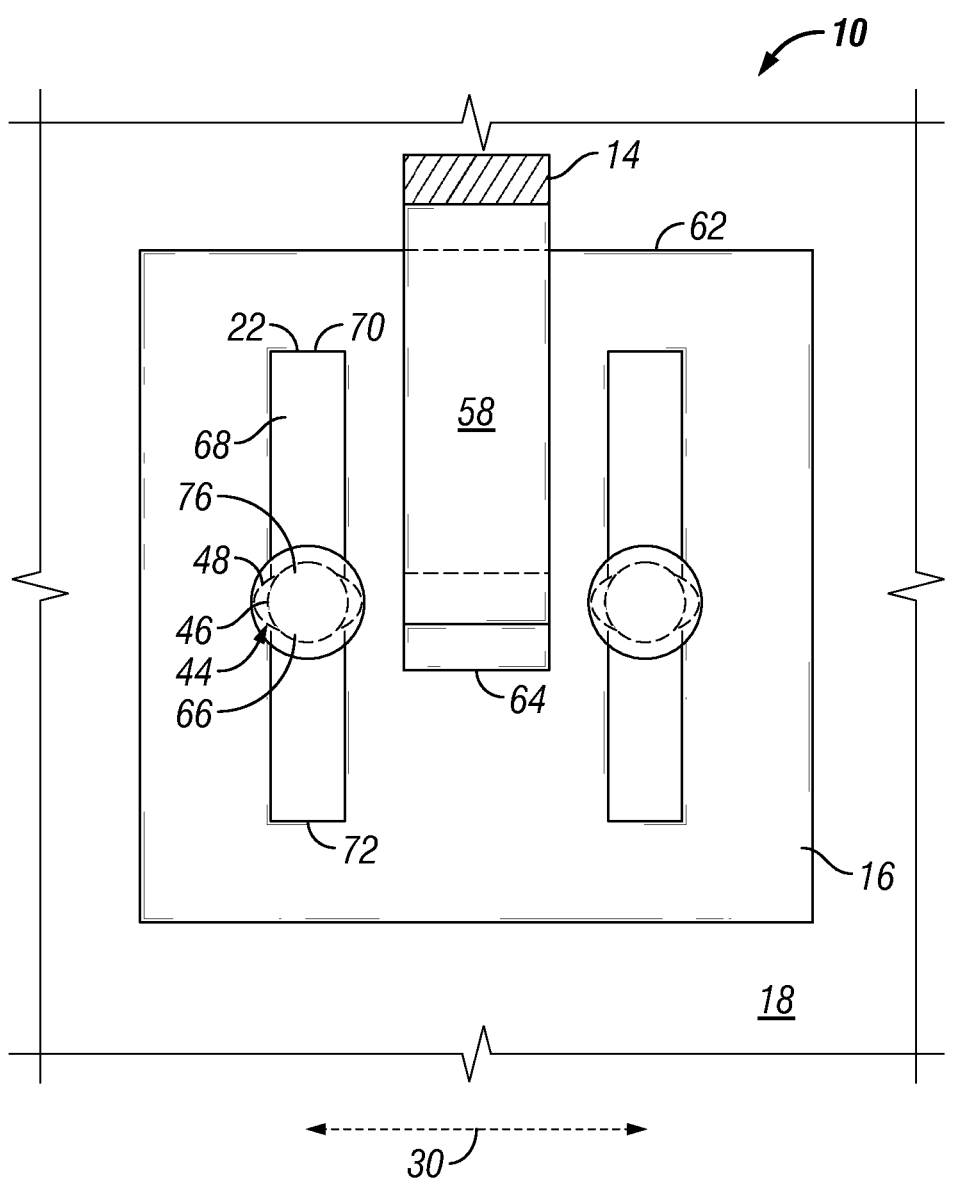
FIG. 19 is a cross-sectional view taken along line 19-19 of FIG. 18.

Although described as having the skirt attachment 16 sliding/moving relative to the bending member 14, it is to be understood that the apparatus 10 includes various embodiments where these two components 14, 16 do not move and/or slide relative to one another but instead remain stationary relative to one another. In all embodiments, the bending member 14 will move relative to the skirt 18. This movement may be a sliding movement but need not be in every instance. One embodiment in which the bending member 14 does not slide relative to the skirt attachment 16 is shown with reference to FIG. 18-21. The trailer mounting bracket 12 is rigidly attached to the trailer 20 via bolts or clamps, and the bending member 14 is integrally formed with the trailer mounting bracket 12 instead of being a separate piece that is attached through a mechanical connection. In such integrally formed arrangements, the trailer mounting bracket 12 is the portion that is located at and attached to the trailer 20 and that may contact the trailer 20. The bending member 14 can be a single member and may deform when the skirt 18 has a force imparted thereon and may spring back into the position shown in FIGS. 18 and 19 once the force is removed. Instead of being vertical in orientation, the bending member 14 is angled relative to the ground. The skirt attachment 16 is attached via welding, bolts, integral formation, or any mechanical connection to an end of the bending member 14. The skirt attachment 16 does not slide relative to the bending member 14. A projection 66 extends from the inside of the skirt 18 and into the skirt attachment 16. The skirt attachment 16 can engage the skirt 18 but is not rigidly attached to the skirt 18 like in previously described embodiments. Instead, the skirt 18 may slide relative to the skirt attachment 16 and bending member 14 during deflection of the skirt 18.

The projection 66 is disposed with a slot 68 of the skirt attachment 16. A locating feature 44 is included in this embodiment and includes the second member 48 which is a concave opening on either side of the slot 68 such that the second member 48 is wider than the rest of the width of the slot 68 along its length. The receptacle 48 forms a pair of concave surfaces on either side of the slot 68 that receives the locating feature 46 that is the convex body of the projection 66. The projection 66 features a body 46 that extends from the skirt 18 to a head 76 that is located on the end of the body 46. The body 46 has a convex surface with a convex radius smaller than a concave radius of the receptacle 48. A portion of the convex surface of the body 46 of the projection 66 extends into both of the receptacles 48, forming engagement points at the leading and trailing ends. The projection 66 is thus held steady within the receptacle 48 during movement of the trailer 20 so that the skirt 18 does not flutter and so that the connection does not move during normal movement of the trailer 20.

Figure 20:
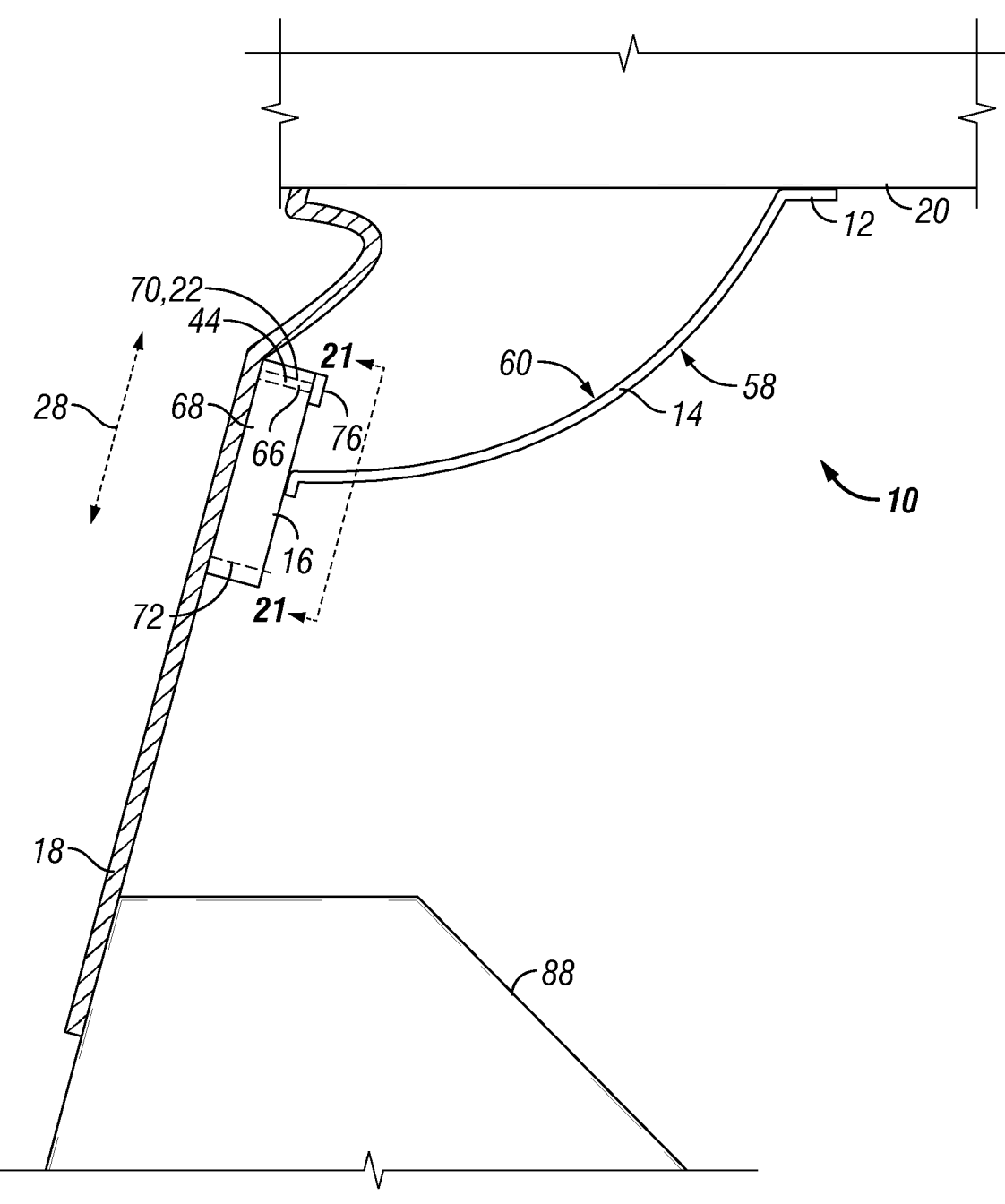
FIG. 20 is a side elevation view of the apparatus of FIG. 18 but with deflection of the skirt and support member being caused by hitting an object.
Figure 21:
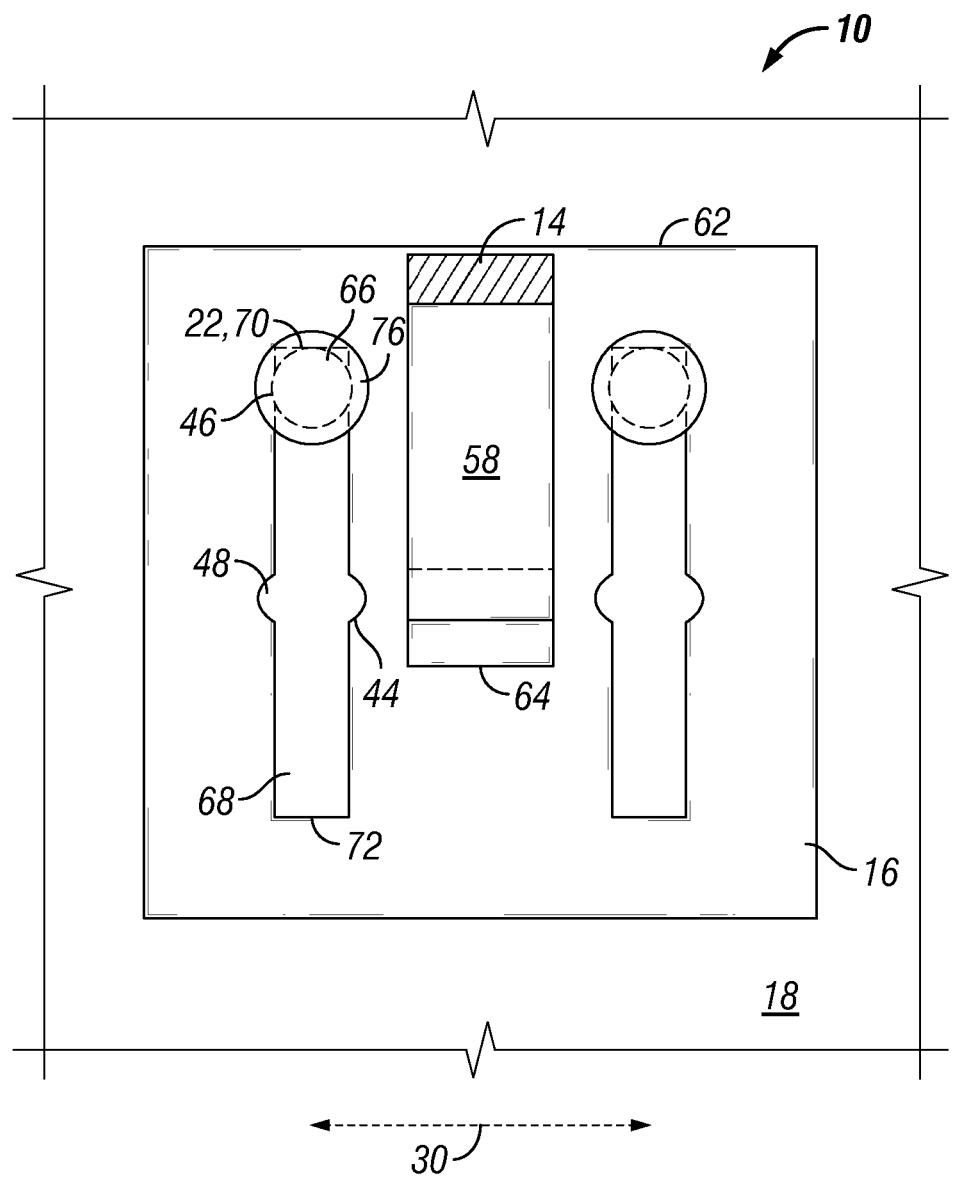
FIG. 21 is a cross-sectional view taken along line 21-21 of FIG. 20.

When the skirt 18 engages an object 88 sufficient to deflect the skirt 18, the force is sufficient to push the body 46 from the receptacle 48 and along the slot 68 so that the projection 66 and skirt 18 slide relative to the bending member 14 and the skirt attachment 16. FIGS. 20 and 21 show this sliding from the at-rest position in FIGS. 18 and 19. The body 46 may slide along the slot 68 via an interference fit of the body 46 within the slot 68. There can be some amount of flexing or deformation to allow the body 46 to slide within the slot 68. The head 76 holds the skirt attachment 16 to the skirt 18 because the head 76 has a diameter that is greater than a width of the slot 68. In this manner, the skirt attachment 16 is locked onto the skirt 18 although it is capable of sliding relative to the skirt 18. The attachment of the bending member 14 at the skirt attachment 16 does not change upon the sliding of the projection 66 within the slot 68. Release of the force from the object 88 causes the apparatus 10 to spring back into the position shown in FIGS. 18 and 19. The locating feature 44 provides the design with a two stage spring rate in which a first force is needed to remove interaction of the members 46, 48, and a second force is needed to bend the single stage bending member 14. The bending member 14 may thus be a strut, as opposed to a bi-modulus cantilevered beam as shown in other embodiments. As shown, the illustrated embodiment has a second projection, slot, and locating feature located on the other side of the attachment of the bending member 14 at the skirt attachment 16. These components can function the same as previously discussed and a repeat of this information is not necessary. Further, in yet other arrangements only a single locating feature 44, projection, 66 and slot 68 are present and the second set is not necessary.

The stop member 22 is integrally formed with the skirt attachment 16 and defines with the skirt attachment 16 the slot 68. The stop member 22 may define an end 70 of the slot 68. The projection 66 can slide within the slot 68 until it engages the stop member 22 at which time its movement stops so that the projection 66 and the skirt 18 do not slide relative to the skirt attachment 16 or the bending member 14. The stop member 22 prevents the projection 66 from becoming disengaged from the skirt attachment 16 which would be the case should the projection 66 be removed out of the skirt attachment 16 and then the force from the object 88 be removed so the components spring back to their normal, at rest positions. The other end 72 of the slot 68 may likewise be a closed end and could be a part of the stop member 22 as well and in this case the stop member 22 could likewise define a portion of the slot 68 at the end 72. The bending member 14 is received by the skirt attachment 16 such that it is rigidly attached to the skirt attachment 16 and does not slide relative to the skirt attachment 16. The bending member 14 accommodates the sliding by being positioned outside of the travel path of the projection 66 along the skirt attachment 16 so that interference does not occur.

Figure 22:
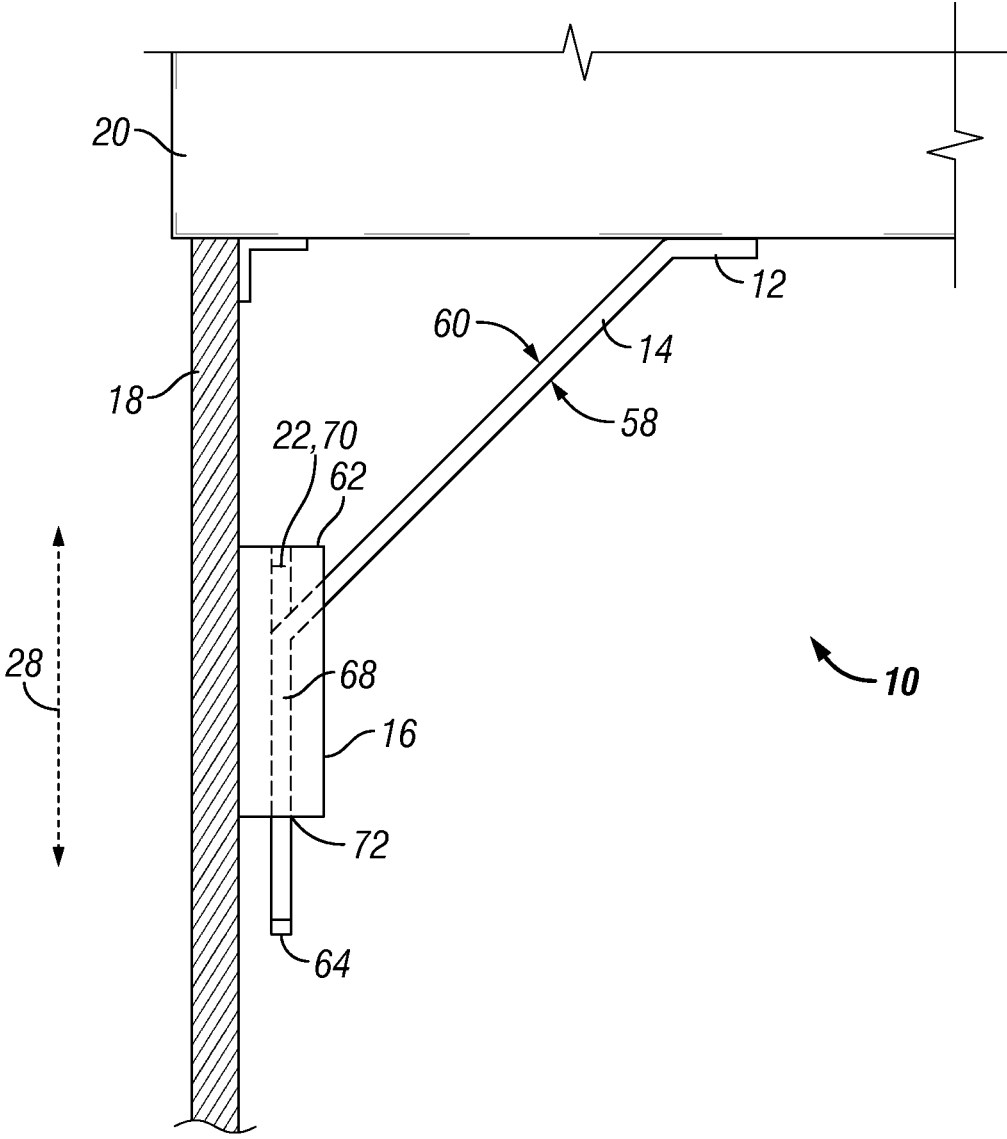
FIG. 22 is a side elevation view of the apparatus in accordance with another exemplary embodiment in which the bending member is a single component that slides along the skirt attachment in which the skirt attachment is rigidly attached to the skirt.

Another exemplary embodiment of the apparatus 10 is shown with reference to FIG. 22 in which the trailer mounting bracket 12 is again integrally formed with the bending member 14, and in which the bending member 14 is a single member component strut positioned at an angle, thus making it non-vertical, to the vertical direction to hold force in compression, whereas the bending member 14 in other embodiments is not a strut because it does not hold force in compression. The bending member 14 at an opposite end engages the skirt attachment 16 which is itself rigidly attached to the skirt 18. The bending member 14 at the skirt attachment is angled and extends from this angled section in a straight manner through the skirt attachment to a terminal end 64 at its bottom. The bending member 14 can slide relative to the skirt attachment 16 in a slot or in edges, and the stop member 22 is present and provides interference so that the angled section of the bending member 14 engages the stop member 22 and is prevented from further upward movement in the sliding direction 28. The bottom face 60 at the angled section is the portion of the bending member 14 that engages the stop member 22 so that further sliding movement in one direction in the sliding direction 28 is prevented. The bending member 14 is free to move in the opposite direction in the sliding direction 28.

Figure 23:
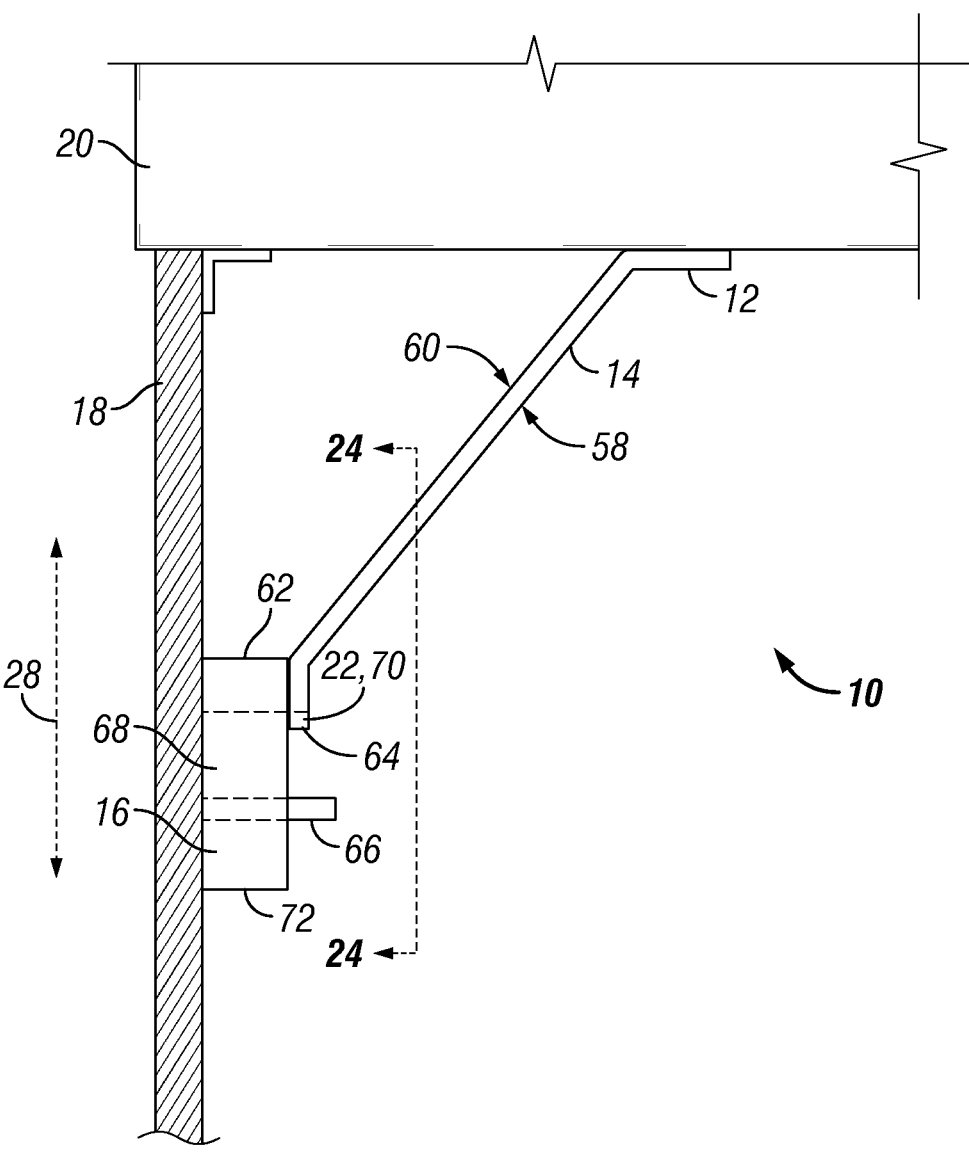
FIG. 23 is a side elevation view of an alternative embodiment in which the stop member is located at the bending member.
Figure 24:
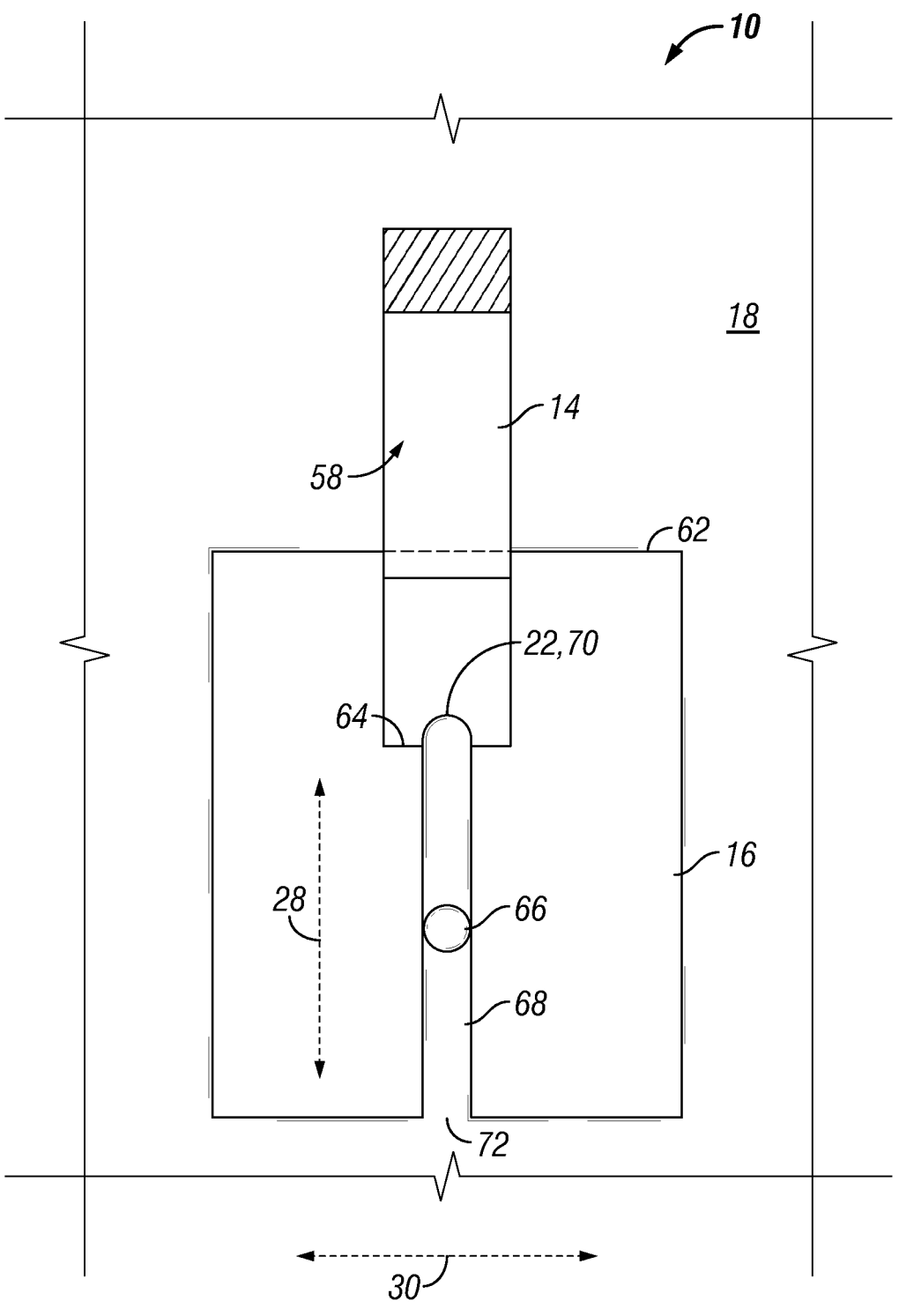
FIG. 24 is a cross-sectional view taken along line 24-24 of FIG. 23.

Another embodiment of the apparatus 10 is shown with reference to FIGS. 23 and 24 which is similar to the FIGS. 18-21 embodiment in that the projection 66 is present and slides in a slot 68 of the skirt attachment 16 which is not rigidly attached to the skirt 18. The slot 68 is open at its bottom end, and the projection 66 does not have a head 76 and a locating feature 44 is not present. The bending member 14 is received by the skirt attachment 16 by being rigidly attached at its end to the skirt attachment 16 and does not slide relative to the skirt attachment 16. The stop member 22 defines an end 70 of the slot 68 and has a concave surface that can receive the counterpart convex surface of the body of the projection 66. The stop member 22 is on the terminal end 64 of the bending member 14 and may be integrally formed with the bending member 14 or could be a separate piece. The projection 66 can slide along the slot 68 as the skirt 18 deflects and likewise slides relative to the bending member 14 and skirt attachment 16. The projection 66 may slide until it engages the stop member 22 at which time further sliding of the skirt 18 in the sliding direction 28 relative to the bending member 14 will cease. Although open at the bottom of the slot 68, the bottom end 72 could be closed as well in other embodiments to prevent the projection 66 from exiting the slot 68.

Figure 25:
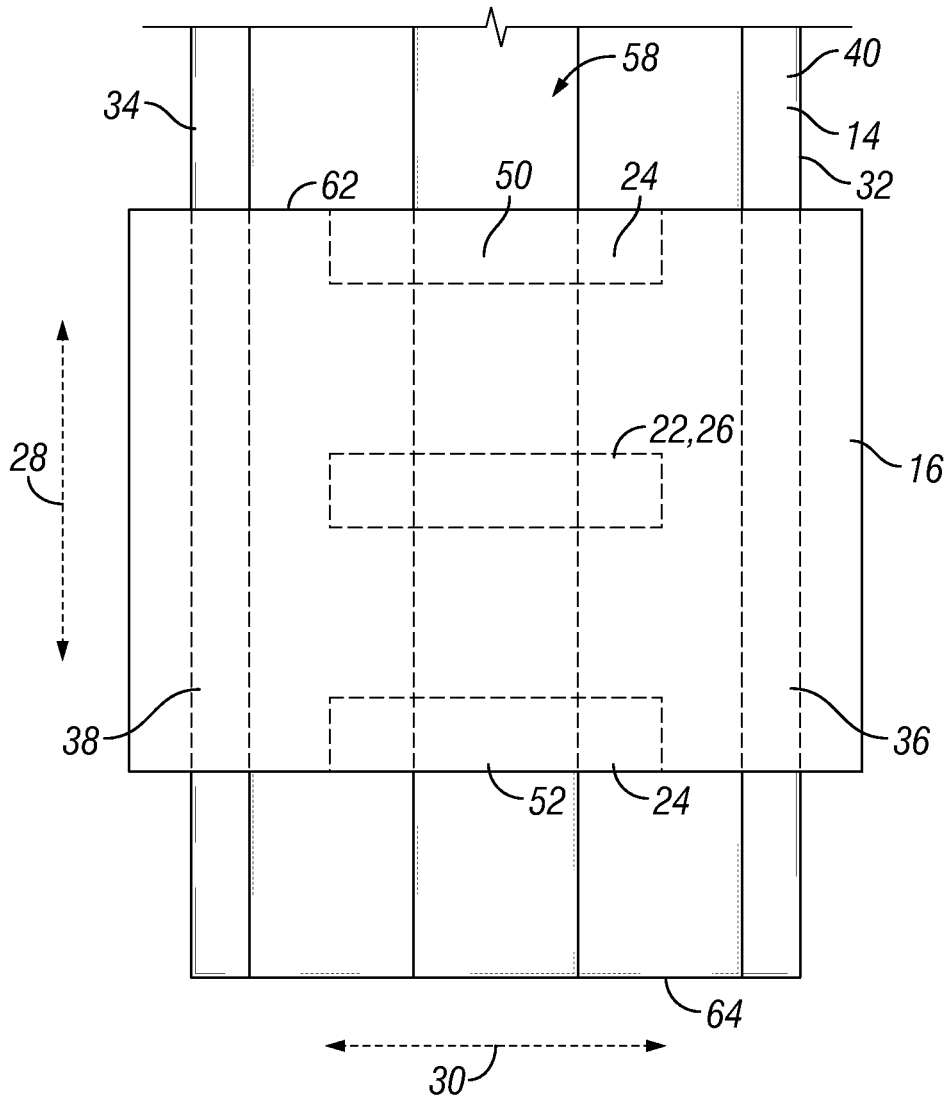
FIG. 25 is a top plan view of an alternate embodiment in which the stop member is arranged to prevent sliding between the bending member and the skirt attachment in two, opposite directions.

Another embodiment of the apparatus 10 is shown in FIG. 25 in which the skirt attachment 16 can be rigidly attached to the skirt 18 so that it does not slide relative to the skirt 18, and in which the bending member 14 engages the skirt attachment 16 with the edge 32, 34 and slot 36, 38 engagement as previously discussed. In this embodiment, the stop member 22 has a second element 26 located on the top face 58 of the bending member 14. The first element 24 has a first component 50 that extends from the terminal end 62, and a second component 52 that extends from an opposite terminal end of the skirt attachment 16. The bending member 14 can slide in the sliding direction 28 with respect to the skirt attachment 16 in either direction, but the stop member 22 limits the degree of sliding in both directions in the sliding direction 28. If the skirt attachment 16 moves downward relative to the bending member 14, the second element 26 will come into engagement with the first component 50 to prevent further downward movement of the skirt attachment 16 in the sliding direction 28 relative to the bending member 14. If the skirt attachment 16 moves upwards in the sliding direction 28 the second component 52 engages the second element 26 to prevent further relative movement between these components 14 and 16. The stop member 22 may thus be arranged to limit relative movement of the skirt 18 and skirt attachment 16 to the bending member 14 in both directions in the sliding direction 28.

The apparatus 10 thus limits sliding of the bending member 14 relative to the skirt 18. Such an apparatus 10 may prevent the bending member 14 and the skirt attachment 16 from becoming disengaged upon deflection of the skirt 18 in that the components remain in an engaged configuration upon both deflection and spring back once the force of deflection is removed. The sliding may be limited by the apparatus 10 in only one or in both directions in the sliding direction 28.

Figure 26:
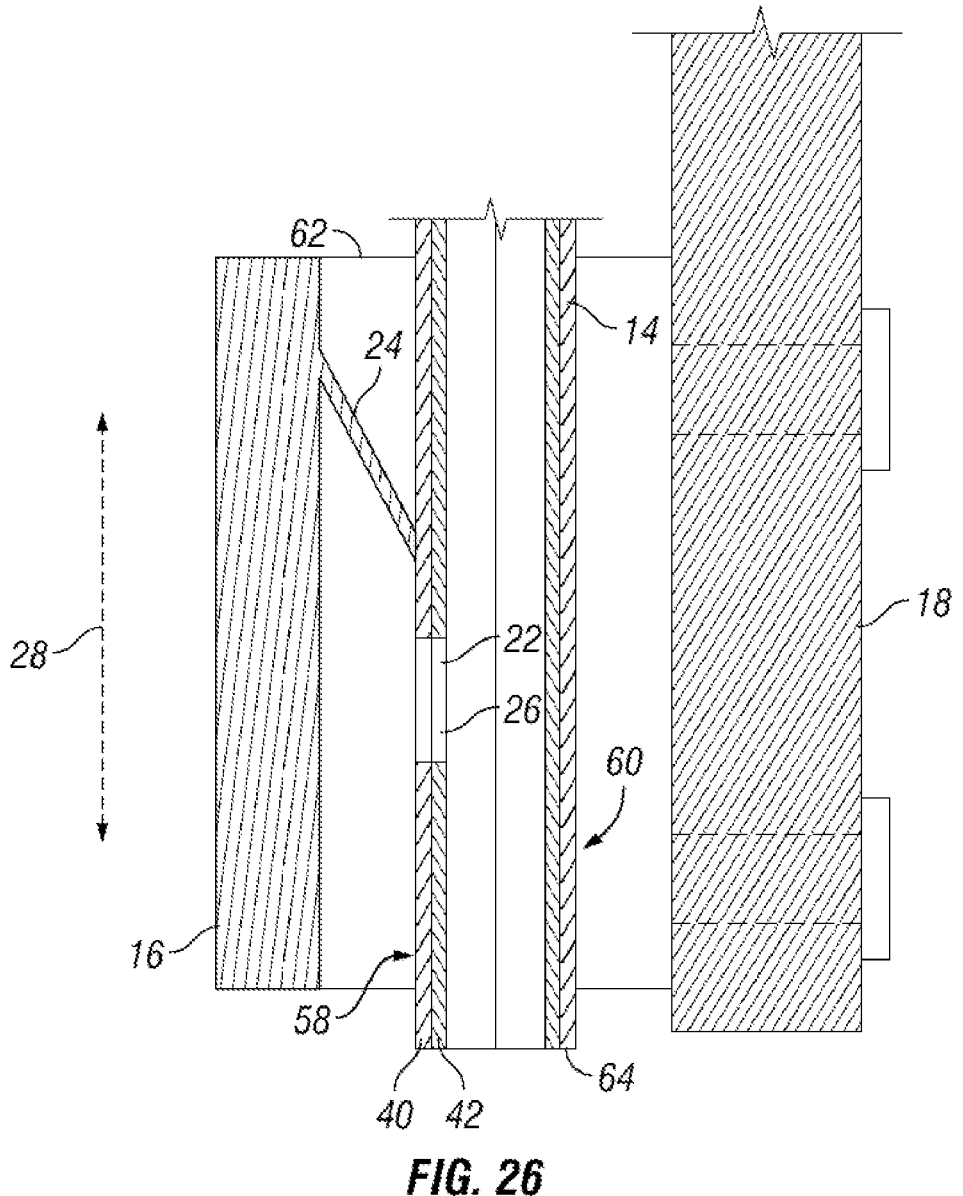
FIG. 26 is a cross-sectional side view of the apparatus showing the stop member having an angled lip disengaged from an aperture.

A further embodiment is shown with reference to FIG. 26 which shows the bottom portion of the apparatus 10 in a cross-sectional side view. The apparatus 10 can be configured as previously discussed and a repeat of this information is not necessary. The stop member 22 is configured differently than other embodiments in that the first element 24 is an angled lip or finger 24 that extends from the skirt attachment 16. The first element 24 does not extend perpendicular to the sliding direction 28 but is instead oriented at a non-parallel and a non-perpendicular orientation to the sliding direction 28 upon extension from the skirt attachment 16. The first finger element 24 can bend some amount and may rest against the top face 58 and engage the top face 58 but not provide any resistance to stopping the relative movement between the skirt attachment 16 and the bending member 14 during use of the apparatus 10. The angle of the first element 24 allows the bending member 14 to be inserted into the skirt attachment 16 when assembling these two parts together. The second element 26 is an aperture through the first and second bending elements 40, 42 of the bending member 14. In other embodiments the aperture 26 can extend completely through the bending member 14, but in the illustrated embodiment the hold 26 does not extend through the third and fourth bending elements of the bending member 14. The hold 26 can be round or slotted or have any cross-sectional shape.

Figure 27:
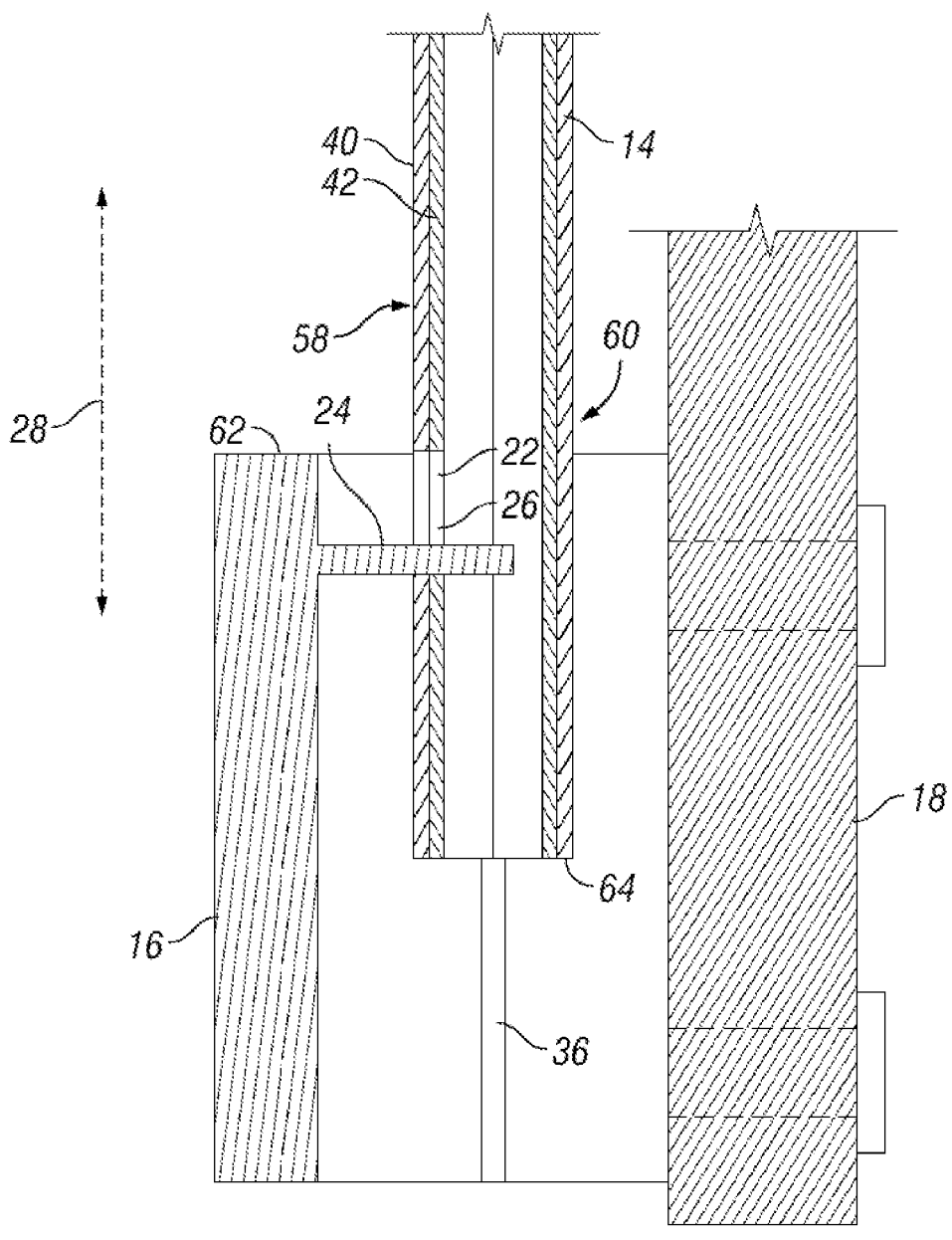
FIG. 27 is a cross-sectional side view of the apparatus of FIG. 26 with the angled lip disposed within the aperture and preventing relative movement.

FIG. 27 shows relative movement of the bending member 14 with respect to the skirt attachment 16 from that in FIG. 26 and upon so doing the first element 24 is moved along the top face 58 until reaching the aperture 26 at which point the first element 24 engages the second element 26 to lock and prevent relative movement of the bending member 14. The projection 24 is disposed within the aperture 26 and the stop member 22 is thus engaged to stop the bending member 14 from moving any more in the sliding direction 28 with respect to the skirt attachment 16. In order to disengage the stop member 22, a user may push the projection 24 out of the aperture 26 so that the projection again engages the face 58. The bending member 14 may then slide relative to the skirt attachment 16.

Figure 28:
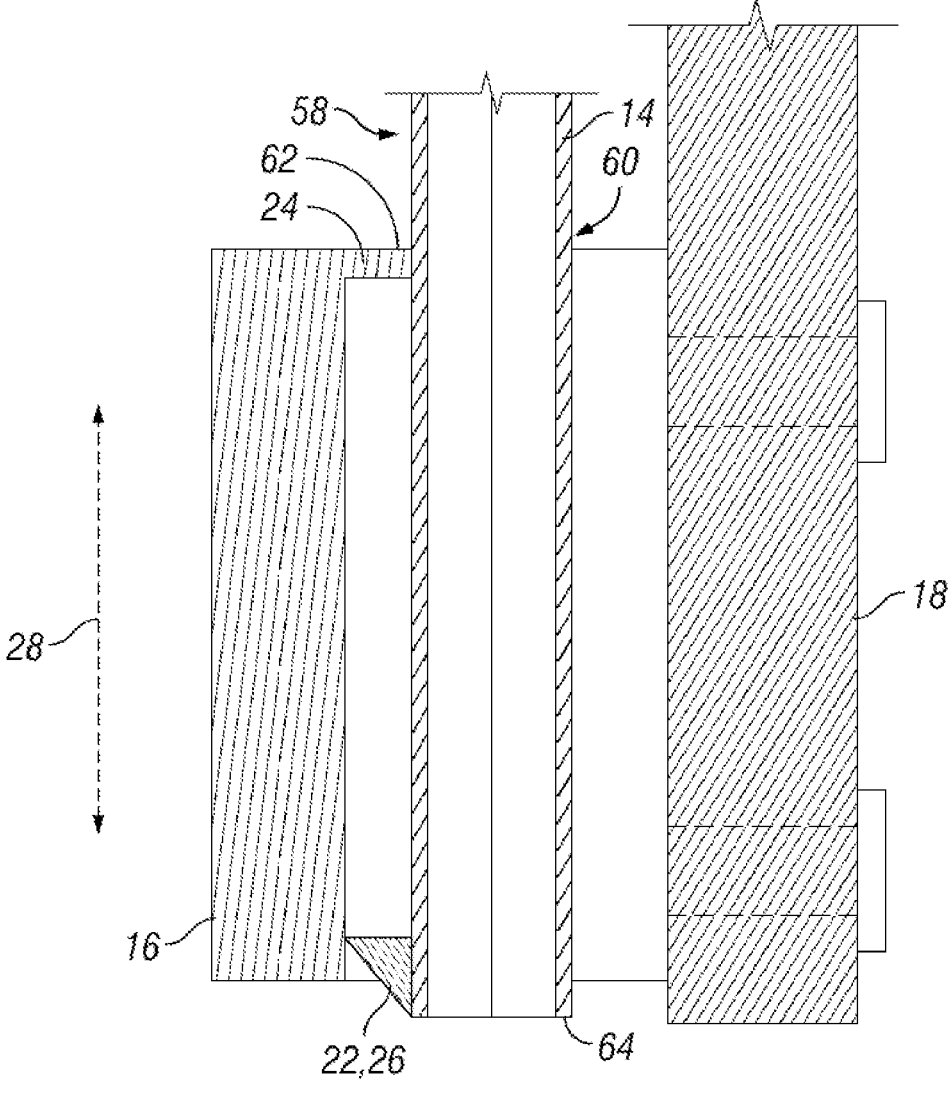
FIG. 28 is a cross-sectional side view of the apparatus in which the stop member is made of two wedge shaped elements.
Figure 29:
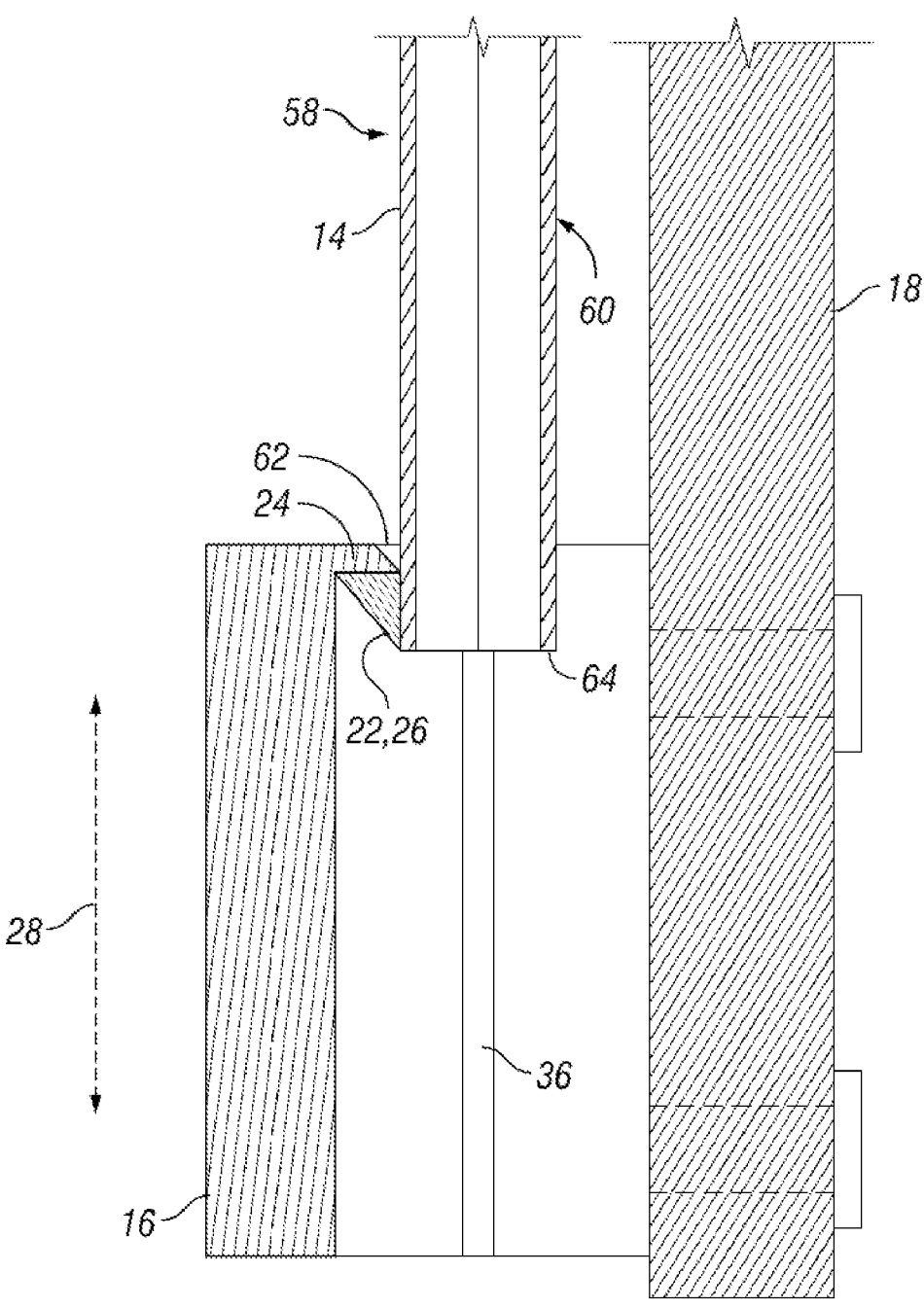
FIG. 29 is a cross-sectional side view of the apparatus of FIG. 28 with the wedges engaging one another to prevent relative movement.

Another embodiment of the apparatus 10 is shown in FIGS. 28 and 29 in which the first element 24 and the second element 26 are both wedges. The first element 24 is integrally formed with the skirt attachment 16 and is at the terminal end 62 but need not be at the terminal end 62 or integrally formed in other embodiments. The second element 26 is at the terminal end of the bending member 14, but again in other arrangements the second element 26 need not be at this location. The apparatus 10 can have other elements the same as previously descried in other embodiments and a repeat of this information is not necessary. Due to the angled nature of the wedges 24, 26 the bending member 14 can be inserted into the skirt attachment 16 for assembly. However, the faces of the wedges 24, 26 are such that they will prevent relative movement when engaged. FIG. 28 shows the wedges 24, 26 disengaged so that the bending member 14 can move relative to the skirt attachment 16 in the sliding direction 28. When the two members 14, 16 move relative to one another a sufficient amount the wedges 24, 26 will come into contact with one another as shown in FIG. 29. When this happens, the engaged faces of the wedges 24, 26 will prevent further relative movement of the bending member 14 out of the skirt attachment 16 so that these components 14, 16 will be locked together so that the bending member 14 can't get disengaged from the skirt attachment 16. If disengagement of the two wedges 24, 26 is desired, a tool can be inserted between them and they can be pried apart a sufficient amount so that relative movement can be established to pull the bending member 14 out of the skirt attachment 16.

It is to be understood that when the stop member 22 is engaged that after the skirt 18 moves away from the object 88 the driver or other person may want to disengage the stop member 22 so that the apparatus 10 can be reassembled. The stop member 22 upon being engaged may be made so that the application of force to it will cause it to be disengaged. The stop member 22 can be arranged so that no more than 35 pounds of force is needed to overcome the stop member 22 to disengage it to effect removal of the bending member 14 out of the skirt attachment 16. In some cases, no more than 40 pounds of force is needed to overcome the stop member 22. As the bending member 14 bends to assume generally follow the shape of the skirt 18 as the skirt 18 bends, it may be the case that significant forces are not imparted to the stop member 22 when engaged. In this regard if one were to apply 25-35 pounds of force to the stop member 22, it would be overcome allowing the bending member 14 to be disengaged from the skirt attachment 16.

Due to the construction of the stop member 22, the force to install the bending member 14 into the skirt attachment 16 is less than the force to slide the bending member 14 off of the skirt attachment 16 to disengage these two components. Aside from using an excessive amount of force to effect detachment, the stop member 22 can be overcome by using tools to push the elements 24, 26 apart in addition to or alternatively to the use of force.

While the present subject matter has been described in detail with respect to specific embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be apparent.

I claim:

1. An apparatus, comprising:
   a trailer mounting bracket;
   a bending member carried by the trailer mounting bracket;
   a skirt attachment configured for engaging a skirt of a trailer, wherein the bending member is received by the skirt attachment such that the bending member is configured to slide relative to the skirt; and
   a stop member that limits sliding of the bending member relative to the skirt;
   wherein the skirt attachment is attached to the skirt, wherein the stop member has a first element located on the skirt attachment, and wherein the stop member has a second element located on the bending member,
   wherein when the bending member slides relative to the skirt the first element and the second element engage each other to prevent the bending member from being removed from the skirt attachment.

2. The apparatus as set forth in claim 1, wherein the skirt slides relative to the bending member in a sliding direction, and wherein the stop member limits sliding of the bending member one way in the sliding direction but not an opposite way in the sliding direction.

3. The apparatus as set forth in claim 1, wherein the bending member has a plurality of bending elements, and wherein a left edge and a right edge of the bending member are received within left and right slots of the skirt attachment, wherein the second element is located on a face of one of the bending elements.

4. The apparatus as set forth in claim 1, further comprising a locating feature that has a first member that is a projection and a second member that is a receptacle, wherein one of the first member and the second member is carried by the skirt attachment and the other one of the first member and the second member is carried by the bending member, and wherein the first member and the second member interact with one another so that the projection is received within the receptacle to stabilize the position of the bending member relative to the skirt until a sufficient amount of force is applied to move the first member and the second member relative to one another to allow the bending member to slide relative to the skirt.

5. The apparatus as set forth in claim 4, wherein the receptacle is on a face of the bending member, and wherein the second element is on the face of the bending member and is made up of a first part and a second part that are both spaced from the receptacle with respect to a width direction of the apparatus that is perpendicular to the sliding direction, wherein the second element is positioned in the width direction so that the second element is between the first part and the second part in the width direction and is offset from the first part and the second part in the sliding direction;

wherein the first element is made up of a first component and a second component that are spaced from one another in the width direction, wherein when the first and second element engage one another the first part and the first component engage one another, and wherein when the first and second element engage one another the second part and the second component engage one another.

6. The apparatus as set forth in claim 4, wherein the bending member has a top face and a bottom face such that the bottom face is configured for facing the skirt and the top face is configured for facing away from the skirt, wherein the bending member has a left edge and a right edge, wherein the skirt attachment has a left slot and a right slot and the left and right edges are disposed within the left and right slots when the projection and the receptacle interact with one another;

wherein the projection and the receptacle are located at either the left edge and left slot or are located at the right edge and right slot.

7. The apparatus as set forth in claim 1, wherein the second element has a first part located on the top face of the bending member and a second part located on the bottom face of the bending member, wherein the first element has a first component and a second component that are spaced from one another in a depth direction of the apparatus, wherein when the first and second element engage one another the first part and the first component engage one another, and wherein when the first and second element engage one another the second part and the second component engage one another.

8. The apparatus as set forth in claim 1, wherein the bending member has a top face and a bottom face such that the bottom face is configured for facing the skirt and the top face is configured for facing away from the skirt, wherein the bending member has a left edge and a right edge, wherein the skirt attachment has a left slot and a right slot and the left and right edges are disposed within the left and right slots;

wherein the first element and the second element are located at either the left edge and left slot or are located at the right edge and right slot.

9. The apparatus as set forth in claim 8, wherein the first element is made up of a first component that is located at the right slot of the skirt attachment, and a second component that is located at the left slot of the skirt attachment;

wherein the second element is made up of a first part that is located at the right edge of the bending member, and a second part that is located at the left edge of the bending member;

wherein when the bending member slides relative to the skirt the first component engages the first part, and the second component engages the second part to prevent the bending member from being removed from the skirt attachment.

10. The apparatus as set forth in claim 1, wherein the first element extends from a terminal end of the skirt attachment, and wherein the second element extends from a terminal end of the bending member.

11. An apparatus, comprising:
a trailer mounting bracket;

a bending member carried by the trailer mounting bracket;
a skirt attachment configured for engaging a skirt of a trailer, wherein the bending member is received by the skirt attachment such that the bending member is configured to slide relative to the skirt;
a stop member that limits sliding of the bending member relative to the skirt; and
a projection located on the skirt, wherein the skirt attachment slides relative to the skirt, wherein the skirt attachment defines a slot and the projection is located within the slot of the skirt attachment, wherein the stop member is an end of the slot and defines with the skirt attachment the slot, wherein the projection is configured to slide along the slot until engagement with the stop member such that sliding of the bending member relative to the skirt is limited; and
wherein the bending member is received by the skirt attachment by having an end of the bending member rigidly attached to the skirt attachment and positioned away from the slot to allow the projection to be configured to slide along the slot.

12. The apparatus as set forth in claim 11, wherein the stop member is both ends of the slot and defines with the skirt attachment the slot.

13. The apparatus as set forth in claim 11, wherein the stop member is integrally formed with the skirt attachment and defines the end of the slot that is a closed end.

14. An apparatus, comprising:
a trailer mounting bracket;
a bending member carried by the trailer mounting bracket;
a skirt attachment configured for engaging a skirt of a trailer, wherein the bending member is received by the skirt attachment such that the bending member is configured to slide relative to the skirt;
a stop member that limits sliding of the bending member relative to the skirt; and
a projection located on the skirt, wherein the skirt attachment slides relative to the skirt, wherein the skirt attachment defines a slot and the projection is located within the slot of the skirt attachment, wherein the stop member is a portion of the bending member that is integrally formed with the bending member, wherein the projection is configured to slide along the slot until engagement with the stop member such that sliding of the bending member relative to the skirt is limited; and
wherein the bending member is received by the skirt attachment by having an end of the bending member rigidly attached to the skirt attachment.

15. The apparatus as set forth in claim 1, wherein the first element and the second element are both wedges.

16. The apparatus as set forth in claim 1, wherein one of the first element and the second element is an aperture, and wherein the other one of the first element and the second element is a projection configured to be disposed within the aperture.

17. The apparatus as set forth in claim 1, wherein from 25-35 pounds of force effects disengagement of the stop member when engaged.

18. The apparatus as set forth in claim 1, wherein the trailer mounting bracket and the bending member are integrally formed with one another.

* * * * *